US012567213B2

(12) United States Patent
McLachlan et al.

(10) Patent No.: US 12,567,213 B2
(45) Date of Patent: Mar. 3, 2026

(54) COMPUTER VISION AND ARTIFICIAL INTELLIGENCE METHOD TO OPTIMIZE OVERLAY PLACEMENT IN EXTENDED REALITY

(71) Applicant: Telefonaktiebolaget LM Ericsson (publ), Stockholm (SE)

(72) Inventors: Paul McLachlan, San Francisco, CA (US); Héctor Caltenco, Oxie (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 187 days.

(21) Appl. No.: 18/007,045

(22) PCT Filed: Jul. 27, 2020

(86) PCT No.: PCT/IB2020/057085
§ 371 (c)(1),
(2) Date: Jan. 26, 2023

(87) PCT Pub. No.: WO2022/023789
PCT Pub. Date: Feb. 3, 2022

(65) Prior Publication Data
US 2023/0351704 A1 Nov. 2, 2023

(51) Int. Cl.
*G06T 19/00* (2011.01)
*G01C 21/36* (2006.01)
(Continued)

(52) U.S. Cl.
CPC .............. *G06T 19/006* (2013.01); *G06T 7/20* (2013.01); *G06V 20/20* (2022.01); *G01C 21/365* (2013.01);
(Continued)

(58) Field of Classification Search
CPC ..................... G06T 19/006; G06T 7/20; G06T 2207/20076; G06V 20/20; G06V 2201/08; G01C 21/365
See application file for complete search history.

(56) References Cited

U.S. PATENT DOCUMENTS 8,200,617 B2 6/2012 Spivack et al.
8,909,648 B2 12/2014 El-Yaniv et al.
(Continued)

FOREIGN PATENT DOCUMENTS

WO 2018/115934 A1 6/2018
WO 2022/023788 A1 2/2022

OTHER PUBLICATIONS

Li et al—Statistical Modeling of Complex Backgrounds for Foreground Object Detection—Nov. 2004—IEEE (Year: 2004).*
(Continued)

*Primary Examiner* — YuJang Tswei
(74) *Attorney, Agent, or Firm* — Nicholson De Vos Webster & Elliott LLP

(57) ABSTRACT

A method of an electronic device in an edge cloud of a mobile network supports extended reality overlay placement for an object having a location in the real world. The method includes receiving a request from an application of a user equipment, the request including an object identifier for an object that is a target of an extended reality overlay, and determining a static motion probability field (S-MPF) for the object identifier.

12 Claims, 16 Drawing Sheets

(51) Int. Cl.
  G06T 7/20 (2017.01)
  G06V 20/20 (2022.01)
(52) U.S. Cl.
  CPC .............. *G06T 2207/20076* (2013.01); *G06V 2201/08* (2022.01)

(56) References Cited

U.S. PATENT DOCUMENTS

| | | | |
|---|---|---|---|
| 9,524,434 B2 | 12/2016 | Gee et al. | |
| 9,541,383 B2 | 1/2017 | Abovitz et al. | |
| 9,672,206 B2 | 6/2017 | Carus et al. | |
| 10,075,813 B1 | 9/2018 | Struhsaker et al. | |
| 10,115,232 B2* | 10/2018 | Miller | G06F 3/013 |
| 10,235,450 B2 | 3/2019 | Thomas | |
| 10,267,924 B2 | 4/2019 | Ramanandan et al. | |
| 10,321,182 B2 | 6/2019 | Herz | |
| 10,424,065 B2 | 9/2019 | Armeni et al. | |
| 10,565,773 B1* | 2/2020 | Tytgat | G06T 15/005 |
| 11,288,319 B1* | 3/2022 | Das | G06F 40/186 |
| 2003/0061028 A1 | 3/2003 | Dey et al. | |
| 2003/0233451 A1 | 12/2003 | Ludvig et al. | |
| 2010/0183192 A1* | 7/2010 | Fritsch | G06T 7/254 |
| | | | 701/469 |
| 2010/0211649 A1 | 8/2010 | Dimas et al. | |
| 2013/0290234 A1* | 10/2013 | Harris | G06Q 30/00 |
| | | | 901/50 |
| 2016/0260255 A1 | 9/2016 | Bean et al. | |
| 2016/0314622 A1 | 10/2016 | Davis et al. | |
| 2016/0378861 A1* | 12/2016 | Eledath | G06V 20/52 |
| | | | 707/766 |
| 2017/0161546 A1 | 6/2017 | Cansizoglu et al. | |
| 2017/0201585 A1 | 7/2017 | Doraiswamy et al. | |
| 2017/0256071 A1* | 9/2017 | Laugier | G06F 17/18 |
| 2017/0339099 A1 | 11/2017 | Levy-Abegnoli et al. | |
| 2018/0160330 A1* | 6/2018 | Frydman | H04W 24/08 |
| 2018/0182475 A1* | 6/2018 | Cossler | G16H 50/50 |
| 2018/0336732 A1* | 11/2018 | Schuster | G06T 19/006 |
| 2019/0068461 A1 | 2/2019 | Barkie et al. | |
| 2019/0080514 A1* | 3/2019 | Nasi | G02F 1/137 |
| 2019/0147220 A1 | 5/2019 | Mccormac et al. | |
| 2019/0204092 A1* | 7/2019 | Wheeler | G05D 1/021 |
| 2019/0238952 A1* | 8/2019 | Boskovich | H04N 21/858 |
| 2019/0319868 A1* | 10/2019 | Svennebring | H04W 24/08 |
| 2019/0339688 A1* | 11/2019 | Cella | H04L 1/18 |
| 2019/0363951 A1 | 11/2019 | Vasseur et al. | |
| 2019/0368868 A1 | 12/2019 | Abovitz et al. | |
| 2020/0005542 A1 | 1/2020 | Kocharlakota et al. | |
| 2020/0026076 A1 | 1/2020 | Beckman | |
| 2020/0069210 A1* | 3/2020 | Berenzweig | A61B 90/361 |
| 2020/0120446 A1 | 4/2020 | Stammers et al. | |
| 2020/0136994 A1* | 4/2020 | Doshi | H04L 41/5051 |
| 2020/0160534 A1* | 5/2020 | Labbe | H04N 21/440281 |
| 2020/0225673 A1* | 7/2020 | Ebrahimi Afrouzi | G06N 5/04 |
| 2020/0302510 A1* | 9/2020 | Chachek | G06Q 30/0639 |
| 2020/0404078 A1 | 12/2020 | Iyer et al. | |
| 2020/0410751 A1* | 12/2020 | Omari | G06V 20/58 |
| 2021/0099547 A1 | 4/2021 | Han et al. | |
| 2021/0110191 A1 | 4/2021 | Gruteser et al. | |
| 2021/0117697 A1 | 4/2021 | Guim et al. | |
| 2021/0263779 A1* | 8/2021 | Haghighat | G06F 9/5061 |
| 2021/0321413 A1* | 10/2021 | Shin | H04W 72/23 |
| 2023/0351704 A1 | 11/2023 | Mclachlan et al. | |

| | | |
|---|---|---|
| 2024/0104171 A1 | 3/2024 | Cardona et al. |
| 2024/0195789 A1 | 6/2024 | Doshi et al. |
| 2024/0212225 A1 | 6/2024 | Lin |

OTHER PUBLICATIONS

Sekiyama et al—Event_recognition_using_object_motion_context—2010—IEEE (Year: 2010).*

Cheng—Edge caching and computing in 5G for mobile augmented reality and haptic—2020—Elsevier (Year: 2020).*

Zhou et al—Ad Hoc Networks—2007—Springer (Year: 2007).*

U.S. Appl. No. 18/007,046, PCT/IB2020/057084, Pending.

U.S. Appl. No. 18/007,045, PCT/IB2020/057085, Pending.

U.S. Appl. No. 18/566,599, PCT/IB2021/055344, Pending.

Alina Kloss et al., "Combining Learned and Analytical Models for Predicting Action Effects from Sensory Data," Oct. 12, 2020, 18 pages, downloaded from https://arxiv.org/pdf/1710.04102.

Anonymous, "Extended Reality (XR) Market, 2025, Growth Rate, Industry Size, Share, Trends, Growth Factors," Jan. 10, 2020, 7 pages, MarketWatch.

Craig Schlenoff et al., "An approach to predicting the location of moving objects during on-road navigation," 2003, 10 pages, downloaded from https://tsapps.nist.gov/publication/get_pdf.cfm?pub_id=824436.

Dirk Schulz et al., "Probabilistic state estimation of dynamic objects with a moving mobile robot," 2001, pp. 107-115, Robotics and Autonomous Systems 34, downloaded from http://www2.informatik.uni-freiburg.de/~burgard/postscripts/web-editions.

Ericsson ConsumerLab and IndustryLab, "5G Consumer Potential: Busting the Myths Around the Value of 5G for Consumers," May 2019, 16 pages, downloaded from https://www.ericsson.com/498f26/assets/local/reports-papers/consumerlab/reports/2019/5g-consumer-potential-report.pdf.

Ericsson ConsumerLab, "Merged Reality: Understanding How Virtual and Augmented Realities Could Transform Everyday Reality," Jun. 2017, 12 pages, downloaded from https://www.ericsson.com/4a2c58/assets/local/reports-papers/consumerlab/reports/2017/ericsson_consumerlab_merged-reality_report_aw-screen.pdf.

ETSI TS 129 572 V15.1.0, "5G; 5G System; Location Management Services; Stage 3 (3GPP TS 29.572 version 15.1.0 Release 15)," Oct. 2018, 36 pages, ETSI.

Kenneth Research, "Global Extended Reality (XR) Market," Nov. 2019, 3 pages, downloaded from https://www.kennethresearch.com/sample-request-10195901 on Aug. 25, 2020.

Stephan Gammeter et al., "Server-side object recognition and client-side object tracking for mobile augmented reality," 2010, pp. 1-8, Computer Society Conference on Computer Vision and Pattern Recognition-Workshops, IEEE.

Vegard Flovik, "How do you teach physics to machine learning models?," Aug. 23, 2018, 14 pages, Towards Data Science, downloaded from https://towardsdatascience.com/how-do-you-combine-machine-learning-and-physics-based-modeling-3a3545d58ab9.

Wenxiao Zhang et al., "CloudAR: A Cloud-based Framework for Mobile Augmented Reality," May 8, 2018, 13 pages, downloaded from https://arxiv.org/pdf/1805.03060.

Wikipedia, "VR positional tracking," May 10, 2021, pp. 1-10.

Yuebin Yang et al., "Multiple Object Tracking with Kernelized Correlation Filters in Urban Mixed Traffic," 2017, pp. 209-216, 2017 14th Conference on Computer and Robot Vision.

* cited by examiner

YOUR TAXI

108km/h

100km/h

ObjectID = A123456

EDGE DEVICE PROCESS S-MPF

EDGE DEVICE PROCESS D-MPF

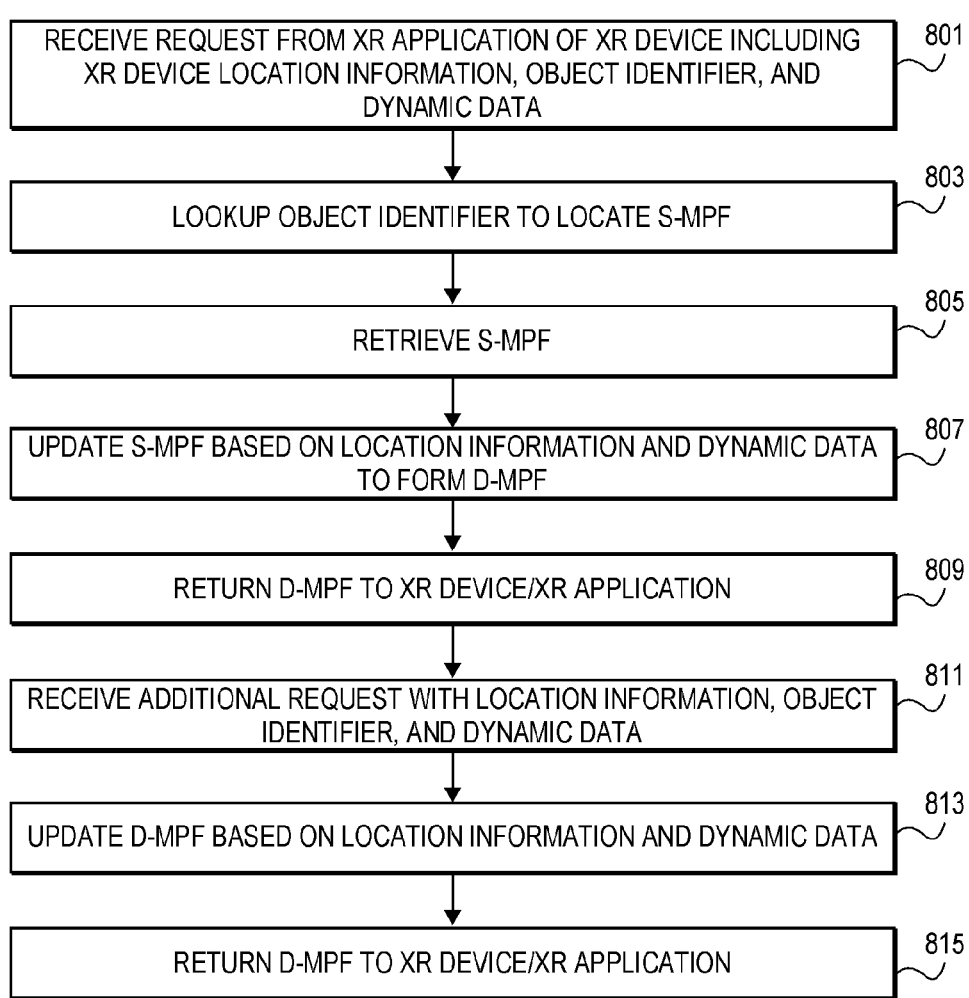

RECEIVE REQUEST FROM XR APPLICATION OF XR DEVICE INCLUDING XR DEVICE LOCATION INFORMATION, OBJECT IDENTIFIER, AND DYNAMIC DATA ⟩ 801

LOOKUP OBJECT IDENTIFIER TO LOCATE S-MPF ⟩ 803

RETRIEVE S-MPF ⟩ 805

UPDATE S-MPF BASED ON LOCATION INFORMATION AND DYNAMIC DATA TO FORM D-MPF ⟩ 807

RETURN D-MPF TO XR DEVICE/XR APPLICATION ⟩ 809

RECEIVE ADDITIONAL REQUEST WITH LOCATION INFORMATION, OBJECT IDENTIFIER, AND DYNAMIC DATA ⟩ 811

UPDATE D-MPF BASED ON LOCATION INFORMATION AND DYNAMIC DATA ⟩ 813

RETURN D-MPF TO XR DEVICE/XR APPLICATION ⟩ 815

PHYSICAL DEVICES AND PHYSICAL CONNECTIVITY

ND 1200H

ND 1200E

ND 1200A

ND 1200F

ND 1200G

SPECIAL PURPOSE HARDWARE

NETWORK FUNCTION VIRTUALIZATION (NFV)

SPECIAL PURPOSE NETWORK DEVICE    1202

GENERAL PURPOSE (COTS) NETWORK DEVICE 1204

HYBRID NETWORK DEVICE 1206

VIRTUAL NETWORK ELEMENT(S)          ND CONTROL PLANE
1230A   • • •   1230R                1224

VIRTUAL NETWORK ELEMENT(S)
1260A   • • •   1260R

1222

CONTROL COMMUNICATION AND CONFIG. MOD. 1232A

1232R

1262A

1262R

NETWORKING SOFTWARE INSTANCE(S)

APP(S) 1264A

APP(S) 1264R

FORWARDING TABLE(S) 1234A

1234R

VIRTUALIZATION LAYER 1254

SOFTWARE INSTANCE(S)

1252

PROCESSORS 1212

1210

FORWARDING RESOURCE(S) 1214

PROCESSOR(S) 1242

PHYSICAL NIS   1216

PHYSICAL NIS 1246

1240

NETWORKING HARDWARE

NON-TRANSITORY MACHINE READABLE STORAGE MEDIA 1218

NETWORKING SOFTWARE 1220

XR OVERLAY SERVICE 1265

HARDWARE

NON-TRANSITORY MACHINE READABLE STORAGE MEDIA 1248

SOFTWARE 1250

XR OVERLAY SERVICE 1265

ND FORWARDING PLANE

1226

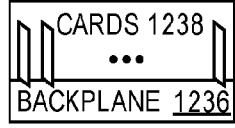

CARDS 1238
• • •
BACKPLANE 1236

FIG. 12B

FIG. 12C
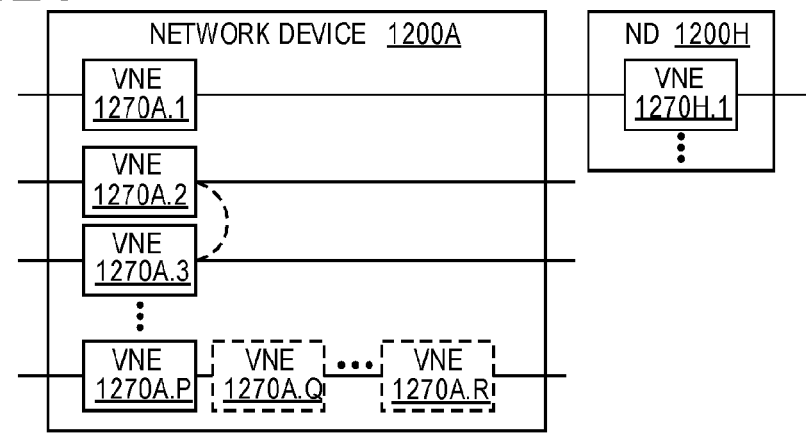
FIG. 12D
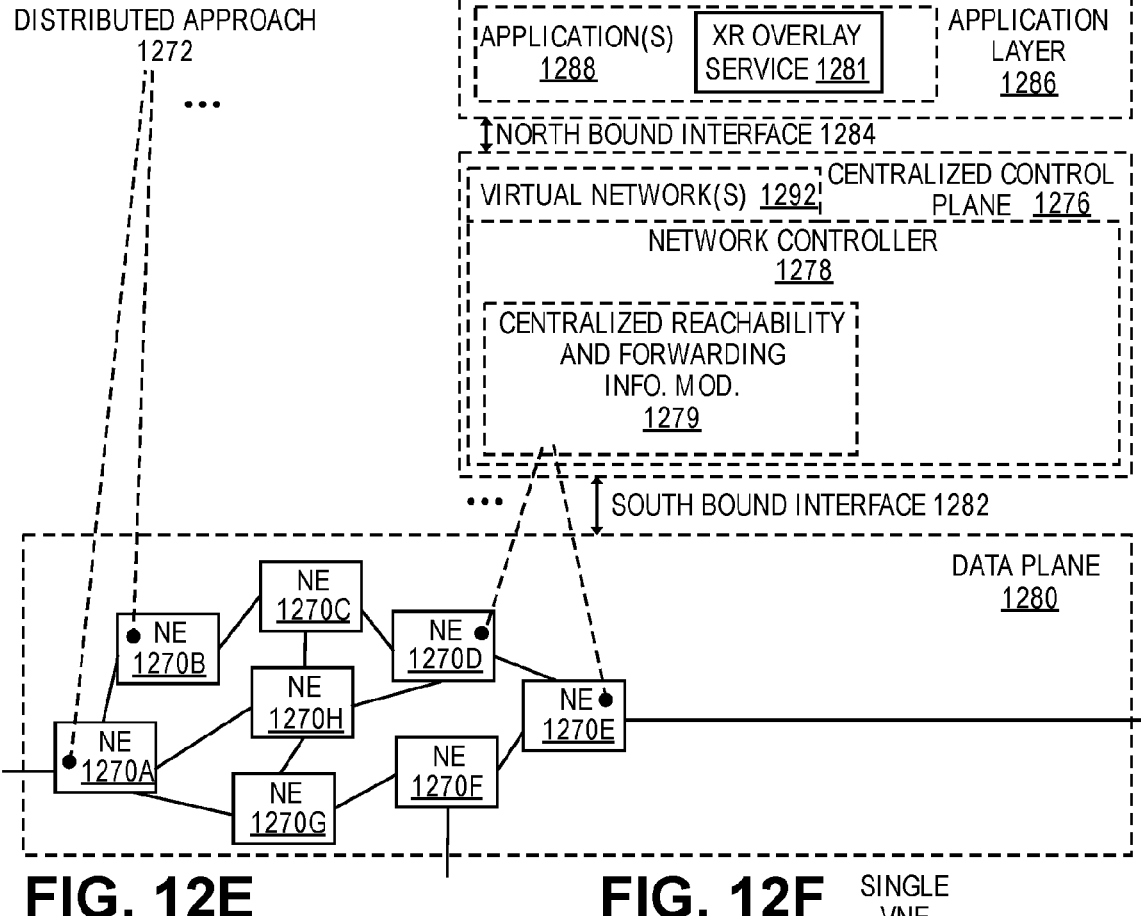
FIG. 12E
FIG. 12F
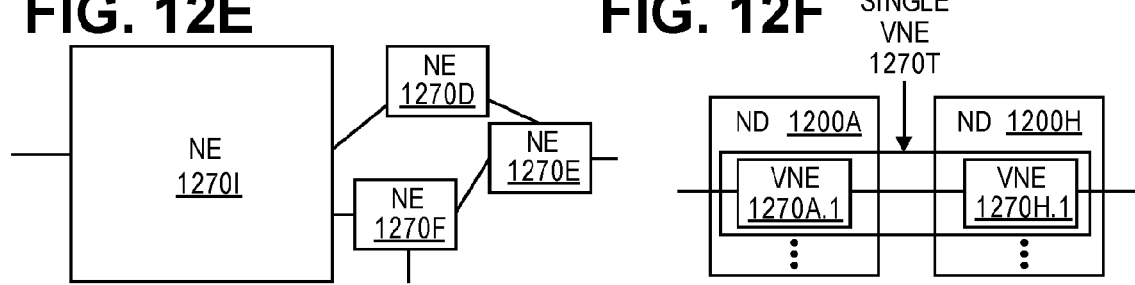

COMPUTER VISION AND ARTIFICIAL INTELLIGENCE METHOD TO OPTIMIZE OVERLAY PLACEMENT IN EXTENDED REALITY

CROSS-REFERENCE TO RELATED APPLICATIONS

This application is a National stage of International Application No. PCT/IB2020/057085, filed Jul. 27, 2020, which is hereby incorporated by reference. This application is related to International Application No. PCT/IB2020/057084, titled PRIVATE SHARING OF LOCATION DATA FOR EXTENDED REALITY RENDERING, filed Jul. 27, 2020, which is hereby incorporated by reference.

TECHNICAL FIELD

Embodiments of the invention relate to the field of extended reality rendering; and more specifically, to a system and process for optimizing overlay placement in connection with extended reality rendering.

BACKGROUND ART

Augmented reality (AR) augments the real world and the physical objects in the real world by overlaying virtual content. This virtual content is often produced digitally and may incorporate sound, graphics, and video. For example, a shopper wearing augmented reality glasses while shopping in a supermarket might see nutritional information for each object as they place it in their shopping cart. The glasses augment reality with information.

Virtual reality (VR) uses digital technology to create an entirely simulated environment. Unlike AR, which augments reality, VR immerses users inside an entirely simulated experience. In a fully VR experience, all visuals and sounds are produced digitally and do not include input from the user's actual physical environment. For example, VR may be integrated into manufacturing where trainees practice building machinery in a virtual reality before starting on the real production line.

Mixed reality (MR) combines elements of both AR and VR. In the same vein as AR, MR environments overlay digital effects on top of the user's physical environment. MR also integrates additional, richer information about the user's physical environment such as depth, dimensionality, and surface textures. In MR environments, the end user experience more closely resembles the real world. As an example, consider two users hitting a MR tennis ball on a real-world tennis court. MR incorporates information about the hardness of the surface (grass versus clay), the direction and force the racket struck the ball, and the players' height. Augmented reality and mixed reality are often used to refer to the same idea. As used herein, "augmented reality" also refers to mixed reality.

Extended reality (XR) is an umbrella term referring to all real-and-virtual combined environments, such as AR, VR and MR. XR refers to a wide variety and vast number of levels in the reality-virtuality continuum of the perceived environment, consolidating AR, VR, MR and other types of environments (e.g., augmented virtuality, mediated reality, etc.) under one term.

An XR device is the device used as an interface for the user to perceive both virtual and/or real content in the context of extended reality. An XR device typically has a display that may be opaque and displays both the environment (real or virtual) and virtual content together (i.e., video see-through) or overlay virtual content through a semi-transparent display (optical see-through). The XR device may acquire information about the environment through the use of sensors (typically cameras and inertial sensors) to map the environment while simultaneously tracking the device's location within the environment.

Object recognition in extended reality is mostly used to detect real world objects and for triggering the digital content. For example, the consumer would look at a fashion magazine with augmented reality glasses and a video of a catwalk event would play in a video instantly. Note that sound, smell, and touch are also considered objects subject to object recognition. For example, a diaper ad could be displayed as the sound and perhaps when the mood of a crying baby is detected. Mood could be deducted from machine learning applied to sound data.

SUMMARY

In one embodiment, a method of an electronic device in an edge cloud of a mobile network supports extended reality overlay placement for an object having a location in the real world. The method includes receiving a request from an application of a user equipment, the request including an object identifier for an object that is a target of an extended reality overlay, and determining a static motion probability field (S-MPF) for the object identifier.

In another embodiment, an electronic device in an edge cloud of the mobile network supports extended reality overlay placement for an object in the real world. The electronic device includes a non-transitory machine-readable medium having stored therein an extended reality overlay service, and a processor coupled to the non-transitory machine-readable medium. The processor executes the extended reality overlay service. The extended reality overlay service receives a request from an application of a user equipment. The request includes an object identifier for an object that is a target of an extended reality overlay, and determines a static motion probability field (S-MPF) for the object identifier.

BRIEF DESCRIPTION OF THE DRAWINGS

The invention may best be understood by referring to the following description and accompanying drawings that are used to illustrate embodiments of the invention. In the drawings:

FIG. 8A is a flowchart of one embodiment of a process of an electronic device in the edge cloud that implements dynamic XR overlay services.

FIG. 12A illustrates connectivity between network devices (NDs) within an exemplary network, as well as three exemplary implementations of the NDs, according to some embodiments of the invention.

FIG. 12B illustrates an exemplary way to implement a special-purpose network device according to some embodiments of the invention.

FIG. 12C illustrates various exemplary ways in which virtual network elements (VNEs) may be coupled according to some embodiments of the invention.

FIG. 12D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments of the invention.

FIG. 12E illustrates the simple case of where each of the NDs implements a single NE, but a centralized control plane has abstracted multiple of the NEs in different NDs into (to represent) a single NE in one of the virtual network(s), according to some embodiments of the invention.

FIG. 12F illustrates a case where multiple VNEs are implemented on different NDs and are coupled to each other, and where a centralized control plane has abstracted these multiple VNEs such that they appear as a single VNE within one of the virtual networks, according to some embodiments of the invention.

DETAILED DESCRIPTION

Figure 1:
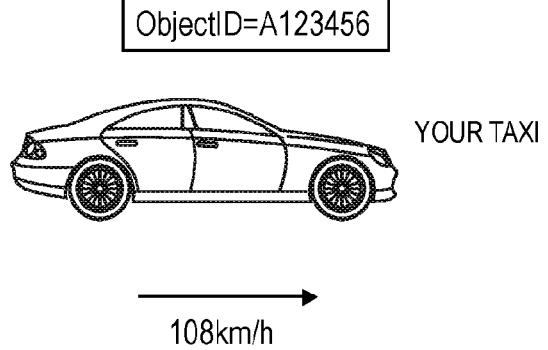
FIG. 1 is a diagram of a moving object that illustrates issues related to the extended reality overlays.
Figure 1:
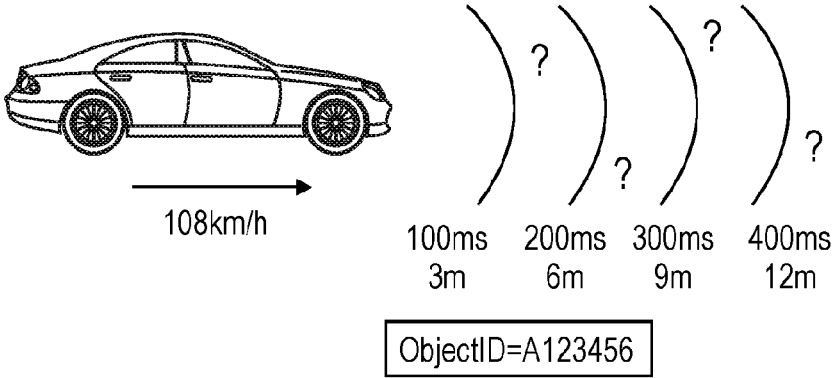

The following description describes methods and apparatus for improving the operation of extended reality applications by assisting these applications in predicting the movement of objects. The methods and apparatus position motion probability fields (MPFs) in edge cloud resources and facilitate the retrieval and usage of these MPFs to enable the extended reality applications to improve rendering of digital overlays at the extended reality devices. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention.

Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors (e.g., wherein a processor is a microprocessor, controller, microcontroller, central processing unit, digital signal processor, application specific integrated circuit, field programmable gate array, other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set of one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of receiving data from other electronic devices over a wireless connection and/or sending data out to other devices via a wireless connection. This radio circuitry may include transmitter(s), receiver(s), and/or transceiver(s) suitable for radiofrequency communication. The radio circuitry may convert digital data into a radio signal having the appropriate parameters (e.g., frequency, timing, channel, bandwidth, etc.). The radio signal may then be transmitted via antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate via wire through plugging in a cable to a physical port connected to a NIC. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

The embodiments present a method and system to use spatial mapping and scene detection paired with computer vision and artificial intelligence to predict the location of visual and other overlays in extended reality. The embodiments utilize an architecture to benefit from improved latency and speed of $5^{th}$ Generation New Radio (5G NR) by the $3^{rd}$ Generation Partnership Project (3GPP) to incorporate image, video, audio, and location data into the estimation of dynamic motion probability fields for overlay placement. The embodiments further introduce an architecture that uses 5G NR's improved latency and speed to allow extended reality devices to access static motion probability fields, stored in the edge cloud, to improve placement of visual overlays without using dynamically calculated data. The embodiments also introduce a means to store either the dynamic or static motion probability fields in the edge cloud. The embodiments can include methods to use artificial intelligence to dynamically learn from mistakes in overlay placement.

The embodiments overcome the problems of the existing art. 5G New Radio (NR) will support dozens of new use cases for consumers and enterprise. Supporting augmented reality (AR) and virtual reality (VR), herein referred to collectively as extended reality (XR) is one of 5G NR's key use cases. By laying critical information, insights, and predictions over an end user's field of vision, XR provides value for consumers and enterprise users and is forecast to grow rapidly. Widespread adoption of XR, and unlocking its commercial potential, requires addressing four key technical impediments. The first relates to streamlining XR devices' form factors. Currently, XR devices perform most of their computation and data processing on the XR device. To enable this computation, today's XR devices integrate powerful, battery-draining electronic circuits. XR devices also have large batteries, resulting in physically large and heavy product design. The second challenge is how to streamline these physical forms. To reduce the need for large circuit boards and batteries, XR devices must conduct ever more processing at the edge and/or in the cloud (hereinafter, "the edge cloud"). Thirdly, XR devices must be connected to mobile and/or Wi-Fi networks that are sufficiently fast to stream large amounts of data with minimal latency.

The fourth technical impediment is placing overlays on top of the correct object. While this problem can be addressed by using computer vision and object detection when objects are unique and stationary, it is a tremendous challenge when a scene has multiple, visually similar objects or objects that move. Moving objects could be located within space by having the object stream its location in the form of latitude, longitude, and altitude obtained via global positioning system (GPS). GPS solutions do not work well in indoor environments, but other ways of locating objects in indoor environments are possible. Radio positioning (e.g., Bluetooth beacons) or marker-based positioning technologies can also be used but requires specific infrastructure. Using visual identifiers (e.g., QR codes) can help locate specific objects relative to the camera position, but these are prone to occlusion. Moreover, these data sources are highly sensitive and lack controls to restrict or control accessing the location information that they produce, which has broad privacy implications.

These challenges can be addressed by XR devices having access to high speed, low latency mobile and/or Wi-Fi networks. Prior to the introduction of 5G NR, earlier mobile networks lacked the capability to directly address these four challenges. For instance, 4G Long Term Evolution's (LTE) upload and download speeds are insufficient to stream uncompressed high definition (HD) audio and video. While audio and video compression codecs allow these data to be streamed over 4G LTE, the loss in fidelity poses challenges for computer vision and artificial intelligence (AI). 4G LTE's latency, moreover, is too high to allow XR devices to push most data processing into the edge cloud. As even small changes in an end user's posture affect the placement of visual overlays, any perceptible lag will diminish the end user experience.

The speed and latency standards in 5G NR 3GPP (e.g., Release 15) solve the speed and latency impediments to widespread XR adoption. The embodiments build on these improvements to introduce a solution to the problem of placing visual overlays in an end user's field of vision. The embodiments build on an architecture that incorporates differential privacy to allow for time-delimited access to location information and location information purging. In some cases, even with 5G NR's low latency, the architectures of the mobile network or Wi-Fi network can be too slow to correctly place visual overlays. This problem is particularly acute when objects move quickly (for example, cars on a freeway) or with inconsistent patterns of movement (for example, athletes). The embodiments introduce an architecture and method to process semantic data (e.g., visual, auditory, location, and sensory data) in the edge cloud, and dynamically predict where an overlay should be placed.

FIG. 1 is a diagram of a moving object that illustrates issues related to the extended reality overlays. The diagram shows the range for a visual overlay for a vehicle traveling at 108 kilometers an hour at different levels of latency. The vehicle in the top panel has an extended reality (XR) overlay situated directly above the vehicle. The XR application may consider this placement to be an ideal placement of an XR overlay for a vehicle (e.g., in this case the car has an ObjectID=A123456) that is to be rendered by an XR application when the user of the XR device is viewing the vehicle. While ideal placement might depend upon the object, XR application design, the end user, and the use case, the embodiments can accommodate any preferred or ideal position for the XR overlay. The bottom panel of FIG. 1 panel shows the uncertainty range over where the ideal placement would be, given minimal changes in network latency. In the example, if there is 100 milliseconds (ms) of latency, then the XR overlay may be 3 meters off the ideal placement. If there is 200 ms of latency, then the displacement may be 6 meters. Similarly, the displacement is 9 meters and 12 meters for latency of 300 ms and 400 ms, respectively.

The embodiments provide a method and apparatus to solve the problem of correctly placing visual overlays in XR renderings by XR applications on XR devices. The embodiments improve overlay placement by integrating semantic understanding and scene detection into artificial intelligence (AI) and machine learning workflows. The embodiments assign a motion probability field (MPF) to each object. Each object is assigned a unique identifier (e.g., an ObjectID). Each MPF describes the probability a given object will move next over a space. An MPF integrates contextual information about the object (e.g., maximum speed, range of motion, physical size, and similar information). This type of MPF does not incorporate real-time conditions, thus, this MPF is static and used to reduce the potential range within a field of view for overlay placement. In the architecture of the embodiments, object placement algorithms can access an MPF as the algorithms run in the edge cloud.

The embodiments utilize an architecture that benefits from the next generation of low latency and high-speed networks (e.g. 5G NR and/or Wi-Fi) to localize physical items (hereinafter, "objects") within a defined space in real-time. These physical items, i.e., objects, are associated with electronic devices capable of communicating with a mobile network to share information with other electronic devices connected to the mobile network. For example, a taxi can either have an embedded device or can associate with a mobile handset device of a driver. 'Objects' as discussed herein encompass both the physical object, e.g., a taxi, and the associated electronic device that enables its connectivity with the mobile network.

Figure 2:
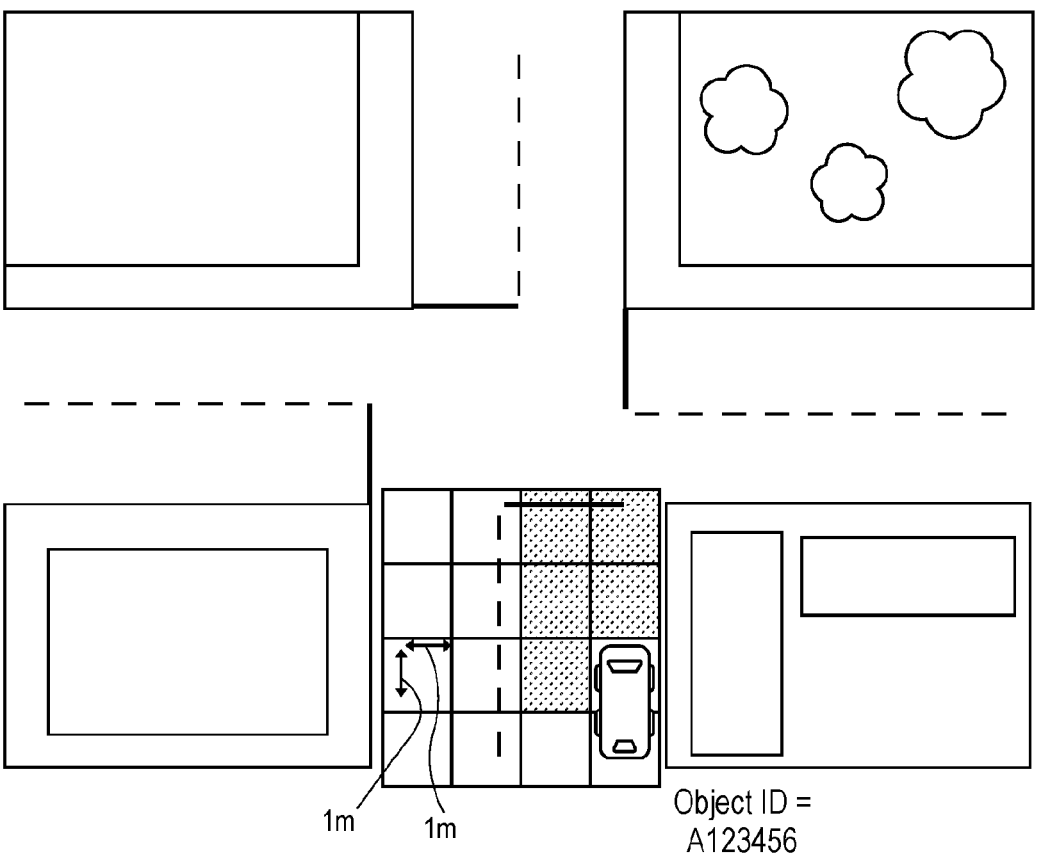
FIG. 2 is a diagram of another example case illustrating the use of a motion probability field (MPF) for predicting where to render an XR overlay.

FIG. 2 is a diagram of another example case illustrating the use of an MPF for predicting where to render an XR overlay. The example is a bird's eye view of a street scene where either a dynamic MPF (discussed below) or static MPF for a vehicle (ObjectID=A123456) is applied. The example shows the probability the vehicle will move forward (or potentially forward and to the side) more than it will move backwards. The MPF can correlate to a space around the object into which the object can possibly move. The area of the space around the object is divided into a set of three dimensional spaces.

The architecture can utilize a global shared real world mapping system. The real world mapping system can divide the real world into two or three dimensional spaces. In one embodiment, a cubic 1-meter grid over the surface of the planet is determined and each cubic meter is assigned a unique alphanumeric identifier referred to as a Cube Identifier (a CubeID) or similar location identifier (LocID). However, in other embodiments, any size, shape, or configuration of a real-world mapping can be utilized. The example of a cubic representation is described herein by way of example and not limitation.

Similarly, the use of CubeIDs or LocIDs are described herein as a mechanism to locate objects, however, one skilled in the art would understand that the principles, processes, and structures described herein are fully compatible with other demarcations of location such as latitude, longitude, and altitude. The CubeID is one type of LocID, which uniquely identifies a location (e.g., a cube) within a spatial mapping system that is correlated with the real world. Any type of location identifier can be used with the embodiments; the example of the CubeID is used herein by way of example and not limitation. Within the edge cloud, each object is assigned an alphanumeric ObjectID that uniquely identifies it. Each object then uploads its location and other data into the edge cloud, in response to changes in that data, at regular intervals, or in response to other events. In some embodiments, to improve efficiency, all location information is matched to the closest CubeID.

Returning to the illustrated example, the MPF correlates with the grid of cubes or similar spatial mapping to determine a probability that the object can move into nearby locations (e.g., cubes) in the subsequent given time frame. In this example, the object cannot go immediately to the right or backward, since it is currently moving toward the intersection. The MPF indicates probabilities that the object (i.e., the vehicle) will be in the illustrated locations (i.e., cubes) at the next timing interval. The grey shaded cubes indicate higher probability and the unshaded cubes lower probability.

Benefitting from the low latency and high speed of 5G NR, the architecture of the embodiments also allows for the dynamic estimation of MPFs (D-MPF). Unlike a static MPF, a D-MPF applies semantic understanding to real-time data (e.g., live audio and video and weather data) uploaded into an edge cloud environment. After estimation, D-MPFs can be integrated into AI and machine learning models to improve overlay placement prediction. Further, the low latency and high speed of 5G NR allow XR devices to access a dynamically predicted range of motion for each object with a visual overlay. After processing real-time semantic and scenario data uploaded from the XR device to the edge cloud, the embodiments assign each object with an overlay with a temporally and situationally dynamic overlay range. Finally, these fields are anonymized and stored in the edge cloud to improve estimation efficiency.

Figure 3:
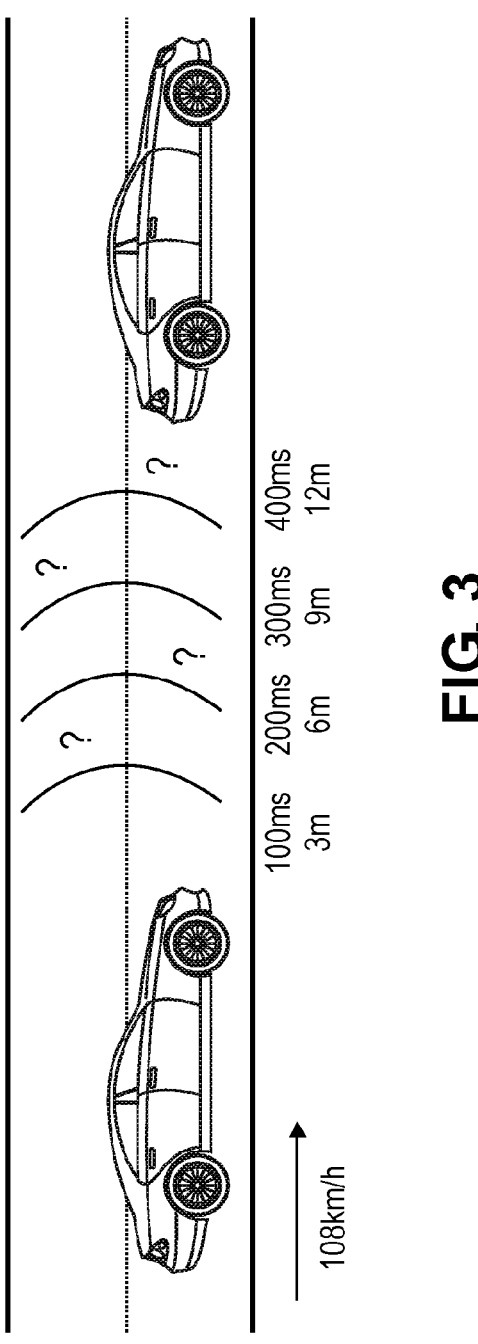
FIG. 3 is a diagram of another example case illustrating issues for predicting where to render an XR overlay.

FIG. 3 is a diagram of another example case where a vehicle is moving at 108 kilometers an hour. The diagram shows the value of dynamically processing semantic data to constrain the potential range of a visual overlay. The example shows how real-time contextual information can be used to improve placement of overlays. In this scenario, the presence of the second vehicle in front of the target vehicle narrows down the possible range where an overlay could be placed. This information is integrated into the real-time dynamic motion probability field (D-MPF) as described further herein. Any algorithms can be used to estimate an object's potential range of motion. These algorithms can utilize any available source of location information and object state information such as acceleration, range, and physical limitations of the object. To that end, the embodiments provide a method for gathering this contextual data and an architecture for processing the contextual data. The embodiments can be utilized with any static-MPF (S-MPF), D-MPF or similar structures. Similarly, the embodiments can work with any algorithms intended to estimate, generate, update, or otherwise update or maintain an S-MPF or a D-MPF using any available information.

Similarly, the embodiments can be utilized in combination with any computer vision, artificial intelligence, or other applications for semantic understanding of physical environments. Such applications can be related to measuring occlusion, object detection, and semantic mapping for a variety of use cases, including mapping indoor small cells and digital advertising in XR. On their own, these applications are insufficient for the use case described herein, as they neither integrate with a privacy-preserving architecture nor are they suitable for predicting overlays in XR. These applications, moreover, do not use 5G NR's latency and speed to allow for both static and dynamic mapping of probability fields.

The following features are missing from these applications: the ability to incorporate image, video, spatial, audio, and location data for purposes of improving visual overlay placement for XR purposes; the ability to process image, video, spatial, audio, and location data paired with spatial mapping and scene detection to derive static and/or dynamic motion probability fields; the ability to predict ideal location for visual overlay placement by the movement range of an object and in the dynamic case other objects in real time in two dimensions which are projected from a three-dimensional space to a two-dimensional plane based on perspective; integrating object detection for purposes of deriving a dynamic motion probability field, whereby the movement patterns and other contextual information is included and processed in the edge cloud; integrating pose (location and orientation) into the visual display in overlay placement for XR/VR, such that the predicted overlay location can be viewed in certain dimensions, and location can be observed differently from different perspectives; the ability to store predicted dynamic and/or static motion probability fields in the edge cloud for future use.

The embodiments address the deficiencies in the art. In this disclosure, we propose a method to estimate static motion probability fields (S-MPFs) and dynamic motion probability fields (D-MPFs) for an object in an XR application. In both cases, an S-MPF and/or D-MPF is used to improve the placement of overlays by an XR application. In the S-MPF case, the S-MPF is estimated using static features of the environment, such as building location information and other infrastructure location information. No real-time environmental information is used for static MPF estimation. In the D-MPF case, the D-MPF integrates information of a dynamic environment streamed real time from the XR device. After processing the real time audio, video, and other data types in the edge cloud, the resulting D-MPF updates in real time. This architecture uses 5G NR and/or Wi-Fi to minimize errors in overlay placement.

Figure 4:
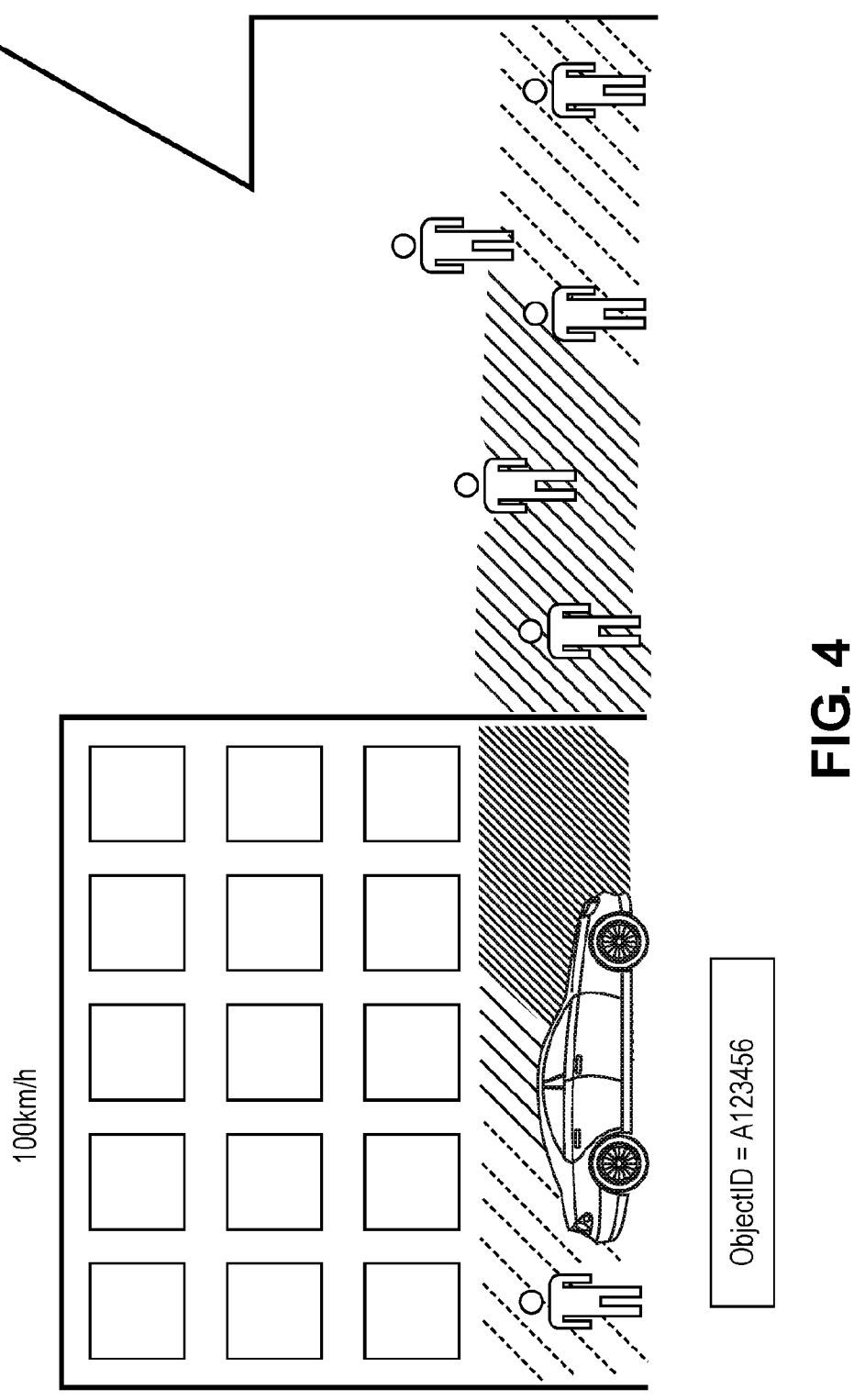
FIG. 4 is a diagram of one embodiment of a motion probability field applied to an example vehicle in a street environment.

FIG. 4 is a diagram of one embodiment of a motion probability field applied to an example vehicle in a street environment. When scanning a scene for purposes of placing a visual overlay in XR, the optimal overlay location estimation predicts a location a use case-defined distance away from the relevant object. The ideal location for an XR overlay is relative to an object, in terms of how far above, below, and how far away, and is likely to vary depending upon the use case, end user preference, and adaptation to factors such as occlusion, bright light, and similar environmental factors. Any method and system can be used for defining and implementing XR overlay placement relative to the object and the associated preferences and configuration.

In the architecture of the embodiments, every object is assigned an ObjectID that is associated with it, and the XR application is able to access a motion probability field (MPF) that is stored within the edge cloud for that object. Depending upon the use case, a global, national, or regional MPF is produced and geospatially relevant subsets from the master MPF are stored within the edge cloud. For purposes of network, machine learning computational efficiency and privacy, an object only has access to the subset of the MPF that is within an arbitrary distance (e.g., in meters) from the object. This arbitrary distance parameter will depend upon the use case, speed of the object, and network connectivity. Any method and system can be used for determining an optimal method for setting the arbitrary distance parameter and associated parameters.

An MPF can be defined, broadly, as a geospatially-defined vector field of penalty or reward scores for movement. In non-technical terms, this means each pairwise combination of geospatial coordinate (latitude, longitude, and altitude) or similar location information (e.g., a LocID) and object type is assigned a likelihood of travel ranging from 0 to 1 or using a similar range. When 0, there is no probability a given object can move to that geospatial coordinate or location. For example, a vehicle cannot move hundreds of meters vertically above the street. Thus, locations above a certain height can be given a 0. When 1, there is a 100% probability a given object will move along the predicted range.

In the illustrated example, the slanted lines indicate different probabilities that the vehicle with ObjectID A123456 will be at these locations in the next time frame. In the example, the vehicle can be traveling at 100 kilometers an hour. The denser the lines, the more likely the MPF indicates it is that the vehicle will travel to that location in the next time frame. In the case where the MPF is dynamic, the D-MPF also integrates information about pedestrians and their current location into its estimation. The static case would not integrate such real time information and only uses information available in a spatial map or model as well as motion dynamics of the object receiving the overlay. Any method or process can be used to generate or predict an MPF (e.g., a S-MPF or D-MPF). XR application developers, mobile network operators, or others can specify preferred processes and methods for generating the MPFs. Example processes are described herein. Any combination or set of specific features can be included in the model to estimate either a D- or S-MPF. Once calculated, the resulting D-MPF or S-MPF can be included within the metadata associated with a particular environment XR and stored in the edge cloud.

The embodiments provide numerous advantages over the art. The embodiments improve end user experience in XR applications by using the low latency and speed of 5G NR to improve visual overlays. This improves experiences for XR application developers, end users, and XR device manufacturers. The embodiments provide a method to improve overlay placement for XR applications based on using the low latency of new generation networks, such as 5G NR to facilitate objects (e.g., Internet of Things (IoT)) sharing their location information in real time, storing location information using differential privacy such that data are only retained and shared according to end user preferences, assigning a unique identifier to each request for access to data retained within the edge cloud such that access is revoked once the transaction completes, measuring physical location in three dimensions such that overlay graphics can be correctly rendered on the XR device, purging data from the edge cloud such that no data with implications for privacy are retained longer than strictly necessary. The architecture of the embodiments has the following advantages: (1) speed, wherein 5G NR in combination with the edge cloud allows for XR devices to access motion probability fields stored in the edge cloud in the static case, and upload visual, audio, spatial, and location data in the dynamic case; (2) scalability, wherein the architecture is scalable since it is designed to operate on the edge cloud; (3) flexibility, wherein the architecture is flexible since any type of network connected XR device can access MPFs stored on the edge cloud and upload data for processing for D-MPFs; (4) context, where by incorporating location data information into spatial mapping and rendering, the architecture disclosed facilitates customized XR overlays for each end user; and (5) dimensionality, where by incorporating all three dimensions (height, width, and depth) into the object-geospatial location pairing, the embodiment supports three-dimensional rendering in XR.

Figure 5:
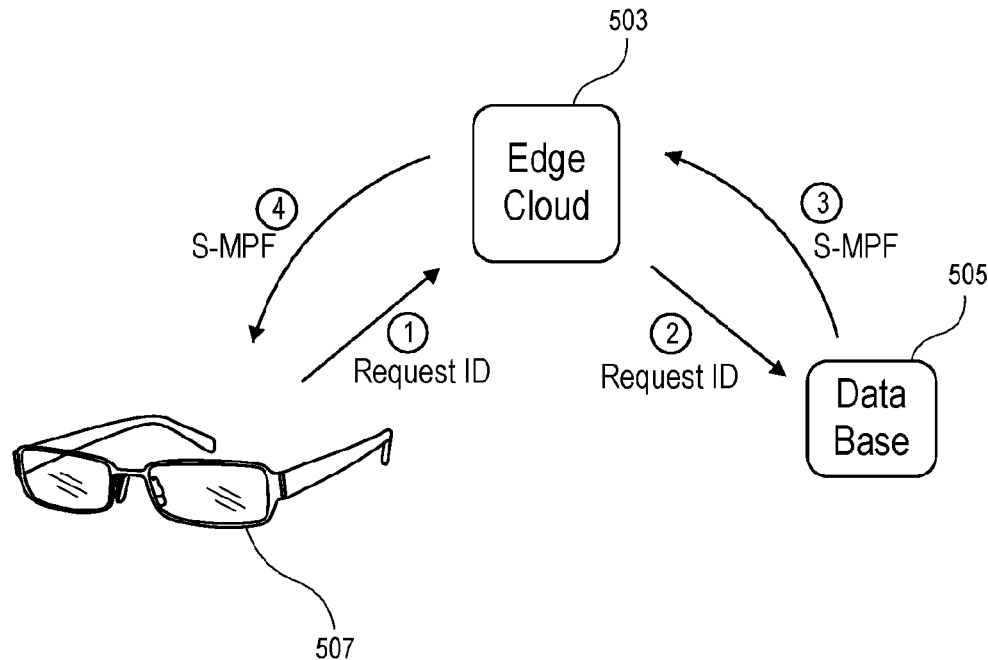
FIG. 5 is a diagram of one embodiment of the architecture of the edge cloud based XR overlay service.

FIG. 5 is a diagram of one embodiment of the architecture of the edge cloud based XR overlay service. This diagram illustrates how an XR application on an XR device 507 accesses a motion probability field, for example, a static-motion probability field (S-MPF) and/or a dynamic motion probability field (D-MPF) stored in the edge cloud 503 or a database 505 associated with the edge cloud. One such way an XR device can access a D-MPF or S-MPF is by generating a RequestID. Once a RequestID is generated, it contains information about the location of the XR device 507, for example geo-spatial coordinates. This information then allows the XR device 507 to receive the relevant D-MPF or S-MPF from the edge cloud 503 and/or database 505. The XR application at the XR device 507 can then utilize the MPF in support of determining how to place visual overlays using any algorithm or placement process.

Prior to the architecture being utilized to provide an MPF, the objects connected with the mobile network and the edge cloud 503 report location information as well as location information retention limits. Each object connected to the mobile network of the edge cloud 503 is assigned an ObjectID and broadcasts its location information to the edge cloud 503. The ObjectID can be assigned, generated, reset, or regenerated by the object, by the edge cloud 503, or a resource (e.g., database system 505) associated with the edge cloud. In some embodiments, the objects can share their location data at varying times. Objects can share location information at any frequency. For example, objects can share location information responsive to changes in location, at fixed intervals, continuously, or any variation or combination thereof. Instead, users or administrators associated with the objects can set the frequency and in some case can manually toggle location sharing on and off (e.g., via a graphical user interface (GUI) on the device or an application associated with the electronic device of the object). Once enabled, location data can be sent as a message, reported, streamed, pushed/pulled, or similarly transmitted via 5G NR, Wi-Fi, or technologies of earlier mobile network generations to the nearest edge cloud environment 503. The location information can be shared using any protocol or format. In one example embodiment, location information is shared in the form of an array containing the ObjectID, location (either as latitude, longitude and altitude, CubeID or other type of LocID), and any other fields that may be required to share additional information.

The location data arrays are processed in the edge cloud 503 and retained in a database 505. If location data is shared in a raw format (e.g., latitude and longitude), these datapoints are assigned to their nearest LocID and the raw data are purged. The collected location information can be utilized at the edge cloud 503 to update MPFs, in particular, D-MPFs. The location information provides information about the environment of the XR device 507 and any object that is to have an XR overlay associated with it. As an object moves in space, new options for further movement become possible based on whether they are blocked by terrain, other objects, structures, or other obstacles. The continuously updating of local object location information enables the MPFs to accurately model the probabilities of the movement of the associated objects.

The edge cloud 503 is a set of electronic devices and resources positioned in proximity to base stations, cells, towers, or similar transmission component in the radio access network (RAN) of the 5G NR mobile network, similar mobile network technologies, earlier mobile network technologies and any combination therewith. The edge cloud services and devices are administered by a mobile network operator (MNO) or similar entity. For sake of clarity and conciseness, the edge cloud 503 services and devices are represented as a single point of contact in the illustration. However, the edge cloud 503 services and devices are distributed over a wide area of a mobile network. Transitioning between connected edge cloud devices as an object or XR device 507 moves through the area of coverage of the mobile network is transparent for purposes of the XR overlay service and is handled by the handover process of the mobile network.

Similarly, the database system 505 in which ObjectID and location information are stored can be co-located with edge cloud devices or resources or can have a low latency connection with the edge cloud devices or resources. The database system 505 can have any format or organization such as an associative or object oriented database system or other type of database system that is capable of storing and associating ObjectIDs with the appropriate location information as it is reported by the objects to the edge cloud 503. Likewise, the MPFs stored in the database 505 can be stored in any format or structure therein according to the organization and operation of the database 505. The database 505 can be distributed over any number of locations and devices to ensure a low latency availability to the XR overlay services of the edge cloud 503.

The architecture of the embodiments enables applications, websites, and other services and tools to access MPFs retained in the edge cloud 503 and database 505 and utilize in their operations. Applications can be executed on any electronic device (e.g., on an XR device 507) that uses the mobile network to transmit requests for MPFs associated with objects to servers controlled by the MNO or the application or jointly administered with the application. In some embodiments, the applications (e.g., XR applications) running on an XR device 507 operate in conjunction with services and functions (e.g., servers) that execute in the edge cloud 503 such that these services and functions are provided by any combination of the developer of the application, which is deployed to the edge cloud 503, and services and functions provided by the MNO, for example as part of XR overlay or other services. The XR overlay services, as used herein, refers to any combination of MNO and developer functions and services deployed to the edge cloud 503 to support the functions described herein. An XR device 507, as used herein, refers to any electronic device that is utilized to render XR via a display, haptic feedback, or other output device and which can include cameras, sensors, positional devices, or other input devices to collect information about the real world around the electronic device.

The XR applications (e.g., at an XR device 507) can access specific MPFs associated with specific objects by generating a RequestID containing information about the physical location of the XR device 507. The XR device 507 uploads the RequestID into the edge cloud 503. The RequestID is used to identify the relevant MPF or forwarded to a database to access the relevant MPF (e.g., a S-MPF or D-MPF stored within the database 505). The requested MPF is returned to the edge cloud 503 by the database 505 or retrieved from a local cache or electronic device of the edge cloud 503. The MPF is then returned by the edge cloud 503 to the XR device 507.

The RequestID is used as part of a lookup process by the edge cloud 503 or database 505. An XR application or related services or functions can send a RequestID that identifies the XR application or associated XR device to the XR overlay service, which includes a lookup or similar service or in other embodiments the lookup process or service is separate from the XR overlay service. The lookup process can identify MPFs that are associated with an ObjectID specified in the RequestID as well as MPFs that are relevant to the location of the XR device 507.

After the lookup process, the matching MPFs are returned to the XR device 507 via the XR overlay services of the mobile network.

Each RequestID can includes specific fields including information about the application requesting the data, as well as, the ObjectID, the billing type for data transfers, the time limit (e.g., in hours) for data retention, a checksum, and similar data. An example of the format of the RequestID is shown below in Table I.

TABLE I

| ABCDEFG | 001 | 000001 | ABC1234567 | 0002 | 0001 |
|---|---|---|---|---|---|
| Application | Billing Type | 6 Digit Prefix | ObjectID | Time Limit | Checksum |

In the example RequestID, the first field (e.g., seven characters) uniquely identifies the application associated with or that generated the RequestID, the billing type indicates who pays for the data transfers, 6 Digit Prefix can be a grouping or type for the object, padding, or similar information, the ObjectID uniquely identifies the object whose MPF is to be retrieved, the time limit (e.g., in hours) is the amount of time the data related to the RequestID can be retained in a database or at the edge cloud, and the checksum is used to validate the RequestID. In this example, the resulting RequestID is ABCDEFG-001000001ABC123456700020001, which uniquely identifies the requesting application. All data retained in the edge cloud 503 related to this RequestID, and the ability of the XR application and/or device 507 to access data in the edge cloud related to this RequestID are purged after the specified time period expires. Other information or formats can be used for RequestIDs. The format described herein above is provided by way of example and illustration and not limitation. Other fields and information can be included, and other types of data structures can be used to organize this data.

In the diagram of FIG. 5, the flow of data is shown in four stages. In the first stage, an XR application on the XR device 507 sends a request to the XR overlay services or application specific services at the edge cloud 503 and/or database 505 identifying an object for which an overlay is to be determined. The XR overlay services perform a lookup based on the ObjectID of the target object identified in the RequestID. The XR overlay services or application specific services can locally search based on the ObjectID and/or forward the search to the database 505 (second stage). The lookup identifies any MPFs that are available for the ObjectID. MPFs can be associated with specific individual ObjectIDs or can be associated with types of objects. In addition, the MPFs can be limited to an area adjacent to the XR device 507 and the current location of the object associated with the ObjectID.

In response to the RequestID, which includes an ObjectID of an object for which the MPF is requested, the MPF is retrieved from the database 505 (stage three) and is sent to the XR overlay services at the edge cloud 503. In the fourth state, the MPF (e.g., an S-MPF) for the object is returned by the XR overlay service to the XR device 507. Once the time limit for the RequestID expires, the edge cloud 503 and/or database 505 purges information related to the XR device, XR application, and the request from the database 505 and/or edge cloud 503. Similarly, if a time limit for the ObjectID expires, the location data and other data associated with the ObjectID including the MPF are purged from the edge cloud 503 and the database 505.

Figure 6:
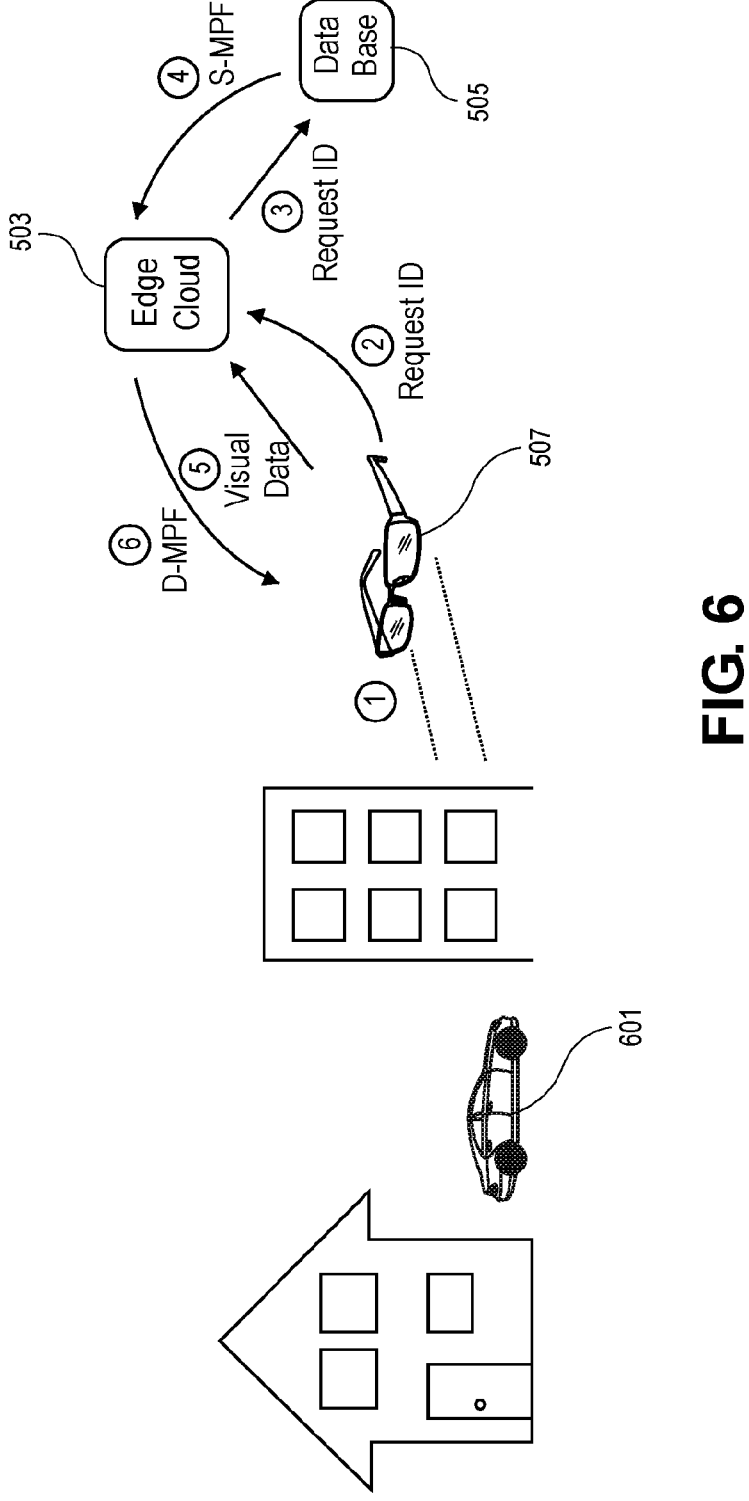
FIG. 6 is a diagram of another embodiment of the architecture of the edge cloud based XR overlay service.

FIG. 6 is a diagram of another embodiment of the architecture of the edge cloud based XR overlay service. In this example, the XR application and XR device 507 provide dynamic information that can be utilized in combination with a D-MPF. In a first stage, the XR device 507 gathers real time dynamic data such as the location and placement of vehicles and structures. In this example, the object 601 and surrounding environment is captured by sensors (e.g., cameras) of the XR device and stored as visual data. In the second stage, the dynamic data is appended to, or transmitted along with, a RequestID and uploaded into the edge cloud 503. The XR application and XR device 507 can communicate with the XR overlay services or application specific services using any communication protocol or mechanism. The dynamic data can be sent using the same methods and protocols as the RequestID or by using other communication protocols or mechanisms. In a third stage, the RequestID is forwarded to a database 505 to access the relevant static motion probability field (S-MPF) stored within the database 505. In a fourth stage, the S-MPF is returned to the edge cloud 503, where it is paired with the dynamic data (e.g., the real time visual data shared by the XR device 507) for processing in the edge cloud 503. In a fifth stage, the dynamic data can be combined with the S-MPF using any process or algorithm for transforming or converting the S-MPF into a D-MPF. In the sixth stage, the resulting D-MPF is returned to the XR device 507.

Any process or algorithm can be used to estimate a static motion probability field (S-MPF). Depending on the type of sensors and the type of environments, different probabilistic state estimation methods could be used. In the below example process, a sufficiently general process is described that can be used to derive a static motion probability field. In a first step of the S-MPF estimation process, the process estimates the pose of the XR Device 507 by the (roughly known, with a positive margin of error introduced) next frame. This could be done based on odometry data of the XR device 507, by movement prediction, and state estimation methods. Any pose estimation algorithms, movement models and movement constraints can be used.

In a second step of the S-MPF estimation process, the process estimates the movement of the tracked object in question by the (roughly known, with a positive margin of error introduced) next frame. The processes can use the estimation as the position of the XR device 507 and can take into account other feature values as provided by sensors or other data collected by the XR device 507. The motion model of objects will depend on the type of trajectories, the motion constrains, and similar considerations. In a third step of the S-MPF process, for objects with more deterministic motion models (e.g., ballistic trajectories), the movement estimate is less complex, and the process can proceed to step four. For objects with non-deterministic motion models, following an order of a movement preference map, the process checks a reasonable number of different possible directions as described in the substeps of this step. "Reasonable" in the above step is dependent upon the object, scene, and other factors. In typical cases, the preference is to either continue the present motion or follow an already predetermined path such as seeking to reach an objective with distance integrated over the proximality allowance map to provide a score. At each sub step, the process: checks the maximum speed, limited by known parameters (e.g., braking power, acceleration power, coefficient of rolling friction, and similar parameters), at which the object will not violate proximity constraints as encoded by negative proximity allowance (e.g., minimum safe distance between the object and cars, drones, pedestrians, and similar considerations); if a proximity violation is inevitable, a negative score is provided, and zero is entered for all positive allowance values, wherein the magnitude of the negative score may represent the enormity of the violation, if known.

In a fourth step of the S-MPF estimation process, the process calculates the positional difference that will be created by the movement of the object in question (i.e., as determined in the second step) and the movement of the XR device (i.e., as determined in the first step). In a fifth step, the process outputs the S-MPF in the form of a vector field of penalty or reward scores for movement based on known parameters and stores it in the edge cloud 503 or database 505, such that it can be retrieved upon request from XR devices.

Similarly, any algorithm or process can be used to estimate a D-MPF. The difference between D-MPFs and S-MPFs is that in the D-MPF, the ability to integrate real time information, such as current position of other objects, is included in the process. The resulting D-MPF is used in real-time to improve overlay positioning. In the D-MPF estimation process below, the process is generalized and can be used to derive a D-MPF.

In a first step of the D-MPF estimation process, the process estimates the pose of the XR device 507 by the (roughly known, with a positive margin of error introduced) next frame. This can be done based on odometry data of the XR device 507, by movement prediction, and state estimation methods. Any pose estimation algorithms or processes, movement models and movement constraints can be used in the pose estimation. In a second step of the D-MPF estimation, the process estimates the movement of the tracked object in question by the (roughly known, with a positive margin of error introduced) next frame. The processes can use the estimation as the position of the XR device 507 and can take into account other feature values as provided by sensors or other data collected by the XR device 507. The motion model of objects will depend on the type of trajectories, the motion constrains, and similar considerations. In a third step of the D-MPF estimation process, the process uses the current and prior visual input, and updates a proximity allowance field. This can be modeled as a vector field of penalty or reward scores for movement.

In a fourth step of the D-MPF estimation process, for objects with more deterministic motion models (e.g., ballistic trajectories), the movement estimate is less complex, and the process can proceed to step five of the D-MPF process.

For objects with non-deterministic motion models, following an order of a movement preference map, the process checks a reasonable number of different possible directions as described in the substeps of this step. The substeps take into account that the preference is to either continue the present motion or follow an already predetermined path, such as seeking to reach an objective, with distance integrated over the proximality allowance map to provide a score. In each substep of the fourth step, the process checks the maximum speed, limited by known parameters (e.g., braking power, acceleration power, coefficient of rolling friction, or similar parameters), at which the object will not violate proximity constraints as encoded by negative proximity allowance (e.g., minimum safe distance between the object and cars, drones, pedestrians, and similar considerations). In a further substep, if proximity violation is inevitable, a negative score is provided, and zero is entered for all positive allowance values, wherein the magnitude of the negative score may represent the enormity of the violation, if known.

In a fifth step of the D-MPF estimation process, the process calculates the positional difference that will be created by the movement of the object in question (i.e., as calculated in the second step) and the movement of the XR device (i.e., as calculated in the first step). In the sixth step, the D-MPF estimation process outputs the D-MPF in the form of a vector field of penalty or reward scores for movement based on known and dynamic parameters, which is then available in the edge cloud 503 and/or database 505.

The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

Figure 7:
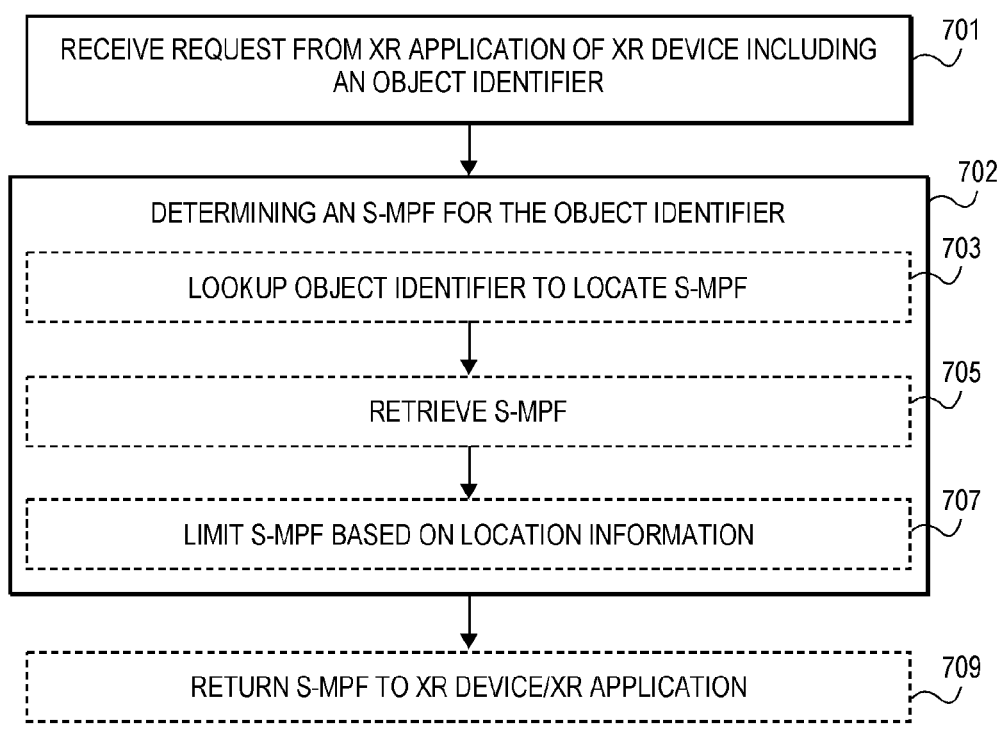
FIG. 7 is a flowchart of one embodiment of a process of an electronic device in the edge cloud that implements static XR overlay services.

FIG. 7 is a flowchart of one embodiment of a process of an electronic device in the edge cloud that implements XR overlay services. The process is initiated responsive to a request of an XR application at an XR device (Block 701). The XR application identifies a real world object, a 'target' object, that is to have an overlay rendered via a display of the XR device. The target object can be identified by any process or mechanism. The target object is associated with an object identifier such as an ObjectID that uniquely identifies the object to the XR overlay services provided by the edge cloud services. The object identifier (e.g., an ObjectID) can be a data structure with any format that is understood by the XR overlay services. The object identifier can include information about the target object or be associated with such information including characteristics of the target object, location information, and a S-MPF. The S-MPF can be specific to the object or can be associated with a type of the object.

The request from the XR application or XR device can include the object identifier and other information about the request and the requesting device, such as location information of the XR device (e.g., in the form of a RequestID as described herein above). The XR overlay service receives the request and utilizes the object identifier found in the request to determine an S-MPF for the object identifier (Block 702). The associated S-MPF can be determined in any manner or using any process. For example, the S-MPF can be identified by performing a lookup or search for an S-MPF associated with the object identifier (Block 703). The lookup can be a query based on a unique identifier of the object identifier, a type of the object, or similar information about the target object. The lookup can be any type of query or search dependent on the storage organization for the S-MPF at the edge cloud or database. For example, a local cache of the edge cloud can be searched using the object identifier, object type or similar identifying information. If the S-MPF is not locally stored or cached, then a query to the database using the identifying information can be performed using any communication protocol, query language, database interface, and similar resources. Once the S-MPF is located it can be retrieved by the XR overlay service (Block 705) and may be returned by the search or lookup process.

In some embodiments, the XR overlay service can modify the retrieved S-MPF or may receive a portion of the S-MPF. The S-MPF can be formatted to cover a large spatial area. In many cases the full S-MPF is not needed by the XR application and a subset of the S-MPF can be provided that is local to the current location of the target object and/or the XR device. In these cases, the S-MPF can be limited, filtered, or similarly scaled to the needs or preferences of the XR device and/or XR application that is requesting the S-MPF (Block 707). In some embodiments, this filtering or limiting of the S-MPF can be incorporated into the lookup process where location information is provided along with the object identification information such that an S-MPF or portion of an S-MPF correlated with the location information (e.g., overlapping the location information within a certain range) can be retrieved. Once the S-MPF is retrieved and scaled to the request of the XR application or XR device, the S-MPF can be returned to the requesting XR device and/or XR application (Block 709).

FIG. 8A is a flowchart of one embodiment of a process of an electronic device in the edge cloud that implements dynamic XR overlay services. The process is initiated responsive to a request of an XR application at an XR device (Block 801). The XR application identifies a real world object, a 'target' object, that is to have an overlay rendered via a display of the XR device. The target object can be identified by any process or mechanism. The target object is associated with an object identifier such as an ObjectID that uniquely identifies the object to the XR overlay services provided by the edge cloud services. The object identifier (e.g., an ObjectID) can be a data structure with any format that is understood by the XR overlay services. The object identifier can include information about the target object or be associated with such information including characteristics of the target object, location information, and a S-MPF. The S-MPF can be specific to the object or can be associated with a type of the object.

The request from the XR application or XR device can include the object identifier and other information about the request and the requesting device, such as location information of the XR device (e.g., in the form of a RequestID as described herein above). In addition, the request can include or be accompanied with dynamic data from the XR device and/or the XR application that sent the request. The dynamic data can include any data collected by the XR device through sensors such as video, location data, audio data, global positioning system (GPS) data, mobile network data, positional data, orientation data, or similar data related to the status or characteristics of the XR device and/or the XR application. The XR overlay service receives the request and utilizes the object identifier found in the request to perform a lookup or search for an S-MPF associated with the object identifier (Block 803). The lookup can be a query based on a unique identifier of the object identifier, a type of the object, or similar information about the target object. The lookup can be any type of query or search dependent on the storage organization for the S-MPF at the edge cloud or database. For example, a local cache of the edge cloud can be searched using the object identifier, object type or similar identifying information. If the S-MPF is not locally stored or cached, then a query to the database using the identifying information can be performed using any communication protocol, query language, database interface, and similar resources. Once the S-MPF is located it can be retrieved by the XR overlay service (Block 805) and may be returned by the search or lookup process.

In some embodiments, the XR overlay service can update the retrieved S-MPF or may receive a portion of the S-MPF to be updated based on the received dynamic data. The S-MPF can be formatted to cover a large spatial area. In many cases the full S-MPF is not needed by the XR application and a subset of the S-MPF can be provided that is local to the current location of the target object and/or the XR device. In these cases, the S-MPF can be limited, filtered, or similarly scaled to the needs or preferences of the XR device and/or XR application that is requesting the S-MPF. In some embodiments, this filtering or limiting of the S-MPF can be incorporated into the lookup process where location information is provided along with the object identification information such that an S-MPF or portion of an S-MPF correlated with the location information (e.g., overlapping the location information within a certain range) can be retrieved.

Once the S-MPF is retrieved and scaled to the request of the XR application or XR device, the S-MPF can be further processed to incorporate the dynamic data (Block 807). The dynamic data can be used to adjust the probability or constraints of the S-MPF to generate a D-MPF. For example, if the dynamic data identifies other nearby objects that may block or limit a path of a target object, then information about those objects can be used to update the D-MPF. The dynamic data can identify any number of other objects, structures, or other items that can impact the probability of the location of an object in a next frame of time. A frame of time, as used herein can refer to any increment of time over which the XR overlay system can assist in predicting an object location via the MPF. Once the S-MPF is updated to generate a D-MPF, the D-MPF can be returned to the requesting XR device and/or XR application (Block 809).

The D-MPF is retained and can be further updated with each additional request received or any updated dynamic data relevant to the target object or the requesting XR device or XR application (Block 811). Additional requests are serviced by updating the D-MPF that is cached or otherwise maintained by the edge cloud without having to retrieve the associated S-MPF for the target object. Each time updated dynamic data is received, the D-MPF can be updated at the edge cloud (Block 813). The updated D-MPF is then returned to the requesting XR device and/or XR application (Block 815). The D-MPF can be continuously updated while being regularly accessed. In some embodiments, the D-MPF can be purged if not being regularly accessed or if restrictions on related requests (e.g., RequestIDs) or objects (e.g., ObjectIDs) require that the associated data including the D-MPF be purged due to a triggering event or timeout.

Figure 8B:
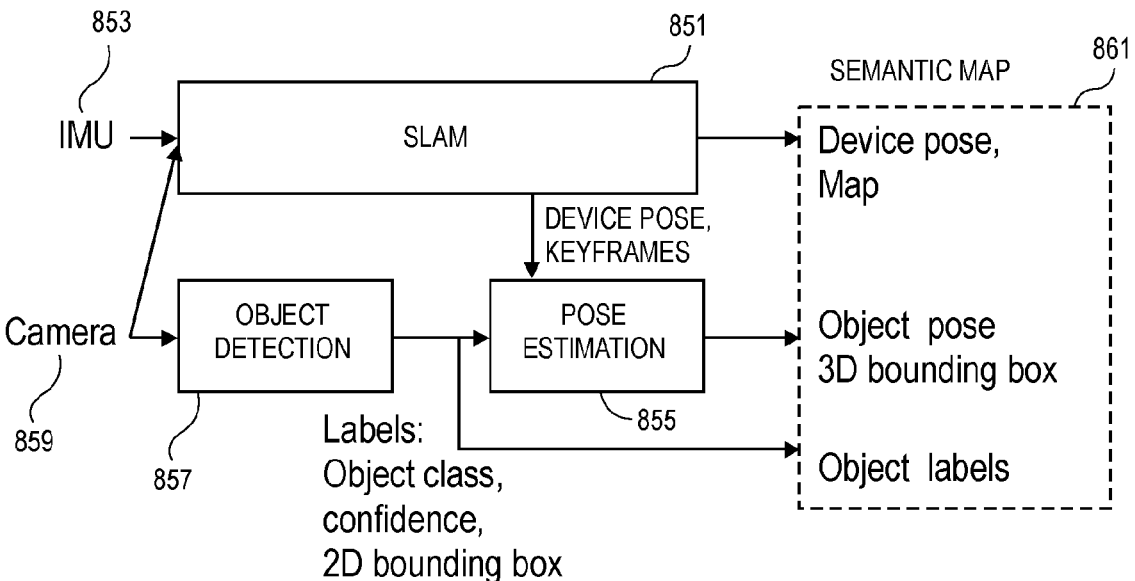
FIG. 8B is a diagram of one embodiment of generation process for a semantic map, which is used for the generation or updating process of a motion probability field (MPF).
Figure 8C:
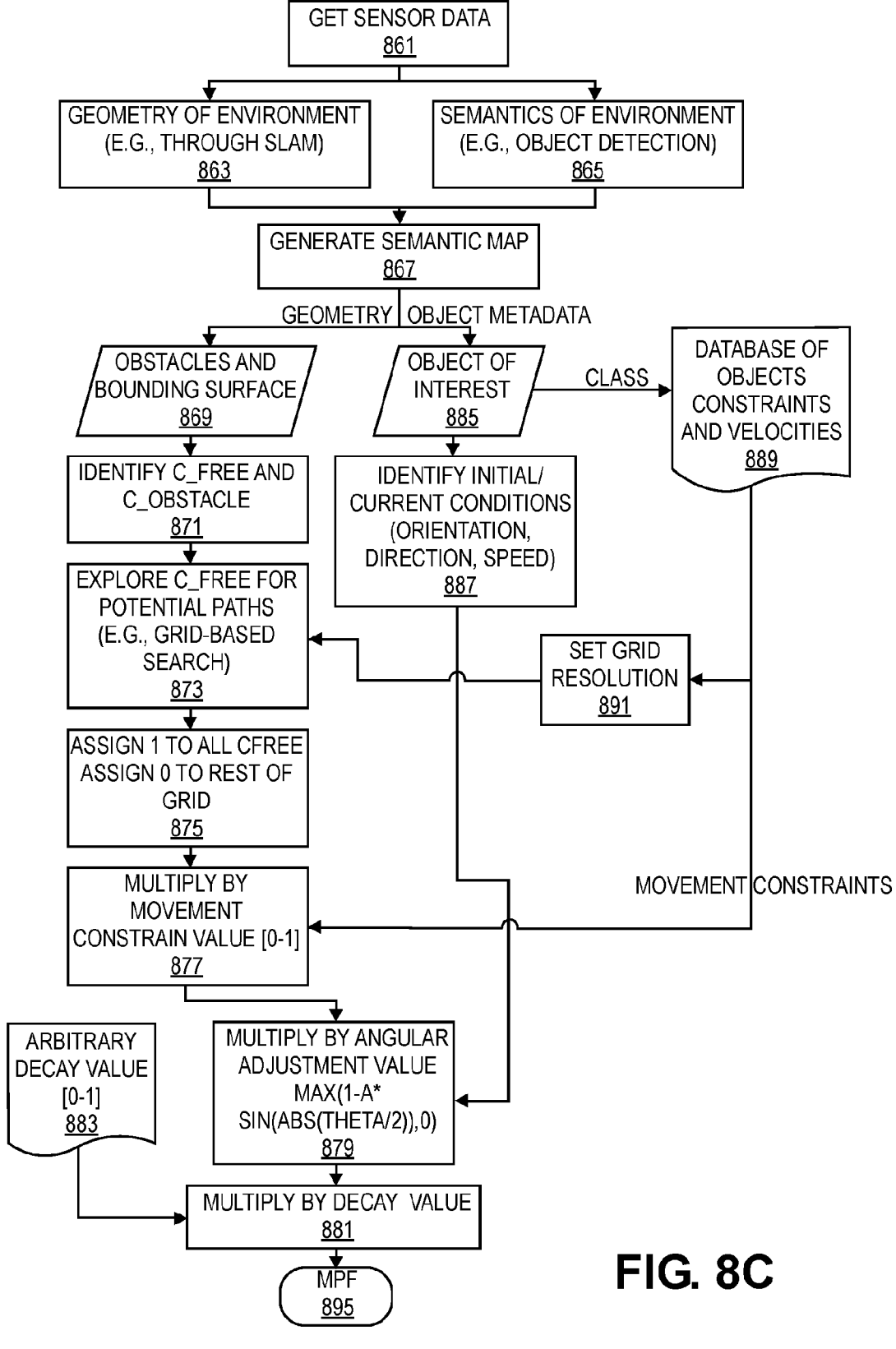
FIG. 8C is a flowchart of one embodiment of dynamic MPF (D-MPF) generation or updating.

FIG. 8B is a diagram of one embodiment of generation process for a semantic map, which is used for the generation or updating process of a motion probability field (MPF). FIG. 8C is a flowchart of one embodiment of dynamic MPF (D-MPF) generation or updating. These processes are described in conjunction with one another, with the D-MPF generation and updating process continuing where the semantic map generation ends. The following description is provided by way of example and not limitation. One skilled in the art would appreciate that there are other processes for MPF generation and management that can be used consistent with the principles and processes described herein. To create a movement probability field from sensor information and map data, the following process can be employed. Initially, the process obtains synchronized (e.g., time-stamped) sensor data, which could be visual (e.g., mono, stereo visual data), depth (RGB-D, lidar, and similar data), visual-inertial, or similar types of sensor data (Block 861).

The process also includes obtaining the geometry of the environment (Block 863). The geometry of the environment can be obtained by performing spatial mapping from sensor data using e.g., simultaneous localization and mapping (SLAM) 851, structure from motion (SfM) or other 3D reconstruction algorithms on inertial measurement unit input 853 or similar sensor data. SLAM can be utilized by XR applications, spatial mapping can be performed in the XR device or in the cloud, e.g., offline in a cloud service or real-time using edge-cloud infrastructure. The process further obtains semantics of the environment (Block 865). The process performs object detection 857 using e.g., convolutional neural networks (CNNs), and estimates the 3D position of the detected objects, directly using depth data (e.g., from a camera or similar sensors 859) or using pose estimation 855 from the keyframes and device pose from the SLAM process 851.

From the geometry and semantics that have been determined, the process constructs the semantic map 861 (e.g., a spatial map with embedded object identities) (Block 867). From the semantic map 861, the process identifies objects of interest in the environment (Block 885). This can involve a lookup based on class of the objects to the database of object constraints and velocities (Block 889). From this set of objects of interest, the initial/current conditions of identified objects, such as orientation, pose, speed and movement direction is determined (Block 887). The process further looks for movement constraints of identified objects based on the class of the object (e.g., with determination of expected velocity and movement constraints from the lookup in the database of objects constraints and velocities. As mentioned, the class information can be determined by a lookup in a database of objects maintained at the edge cloud (Block 885). With this set of information determined (Blocks 885, 887, 889) constraints for relevant objects can be determined. For example, a car cannot move laterally, but can move front and back, a person can move in all directions, both a car and a person are floor-bounded and are unlikely to move vertically.

Based on identified obstacles and bounding surfaces (Block 869), the process further identifies spaces on the spatial map that the object is free to move to ($C_{free}$) and spaces that the object cannot move to ($C_{obstacle}$) (Block 871). This identifies the spaces where the objects' geometry collides with the environment geometry. The process sets a grid resolution (Block 891) based on the expected velocity and the expected computational frequency. The faster the objects move, the faster the computational frequency that is needed for maintaining good accuracy on movement prediction. The grid resolution is input to define a grid for the grid-based search. The process performs a grid-based search over $C_{free}$ to identify potential paths (Block 873). At each grid point, the object is allowed to move to adjacent grid points as long as the line between them is completely contained within $C_{free}$. An exhaustive grid-based search would construct a complete road map of possible locations. There is no need for a full road map to be built. The process can be optimized to use starting point information, like initial conditions (speed and direction) and a traversal of a few successive grid points would be sufficient to complete the grid-based search. Other motion planning algorithms could be performed instead of grid-based search, like sampling-based algorithms, fuzzy algorithms, artificial potential fields, and similar motion planning algorithms to explore $C_{free}$ for potential paths.

Based on the identified initial conditions and constrains, the process constructs a probability field around the current state of the identified object. Depending on the desired/available framerate for calculations. Points on the probability field will be a value between 0 and 1 describing the likelihood of an object to move to a certain position based on the current position, orientation, movement direction and speed, taking into account the movement constrains. The probability field is constructed from all possible movement grid spaces obtained in the grid-based search (or similar search) with the origin of the search on the current point. The process assigns a value of 1 to all obtained possible movement directions in $C_{free}$ and 0 to the rest of the grid (Block 875). The process multiplies by the object movement constraints value in all immediate directions (e.g., zero for constrained directions and 1 for allowed directions) (Block 877). The movement constraints can be obtained from the database of objects constraints and velocities (Block 889). Based on the current orientation, direction and speed, the process multiplies by an angular adjustment value in the direction of travel "ang_adj=max(1−a*sin(abs(theta/2)),0)", where theta is the deviation from the travel direction and "a" is a constant between 0 and infinite (Block 879). An angular adjustment value of zero will allow unrestricted change of direction, a large angular adjustment value will only allow a continuation towards the current direction of travel. The speed of the object is multiplied by a decay value [0-1] times the grid distance to predict the current position (Block 881). The larger the value, the slower the decay with the distance. Decay values can be specified by any mechanism or property of the object (Block 883). For example, different classes or categories of objects can be associated with different decay values. The result of these modifications is a D-MPF 895 that can be stored at the edge cloud and returned to an XR application or XR device.

Figure 9:
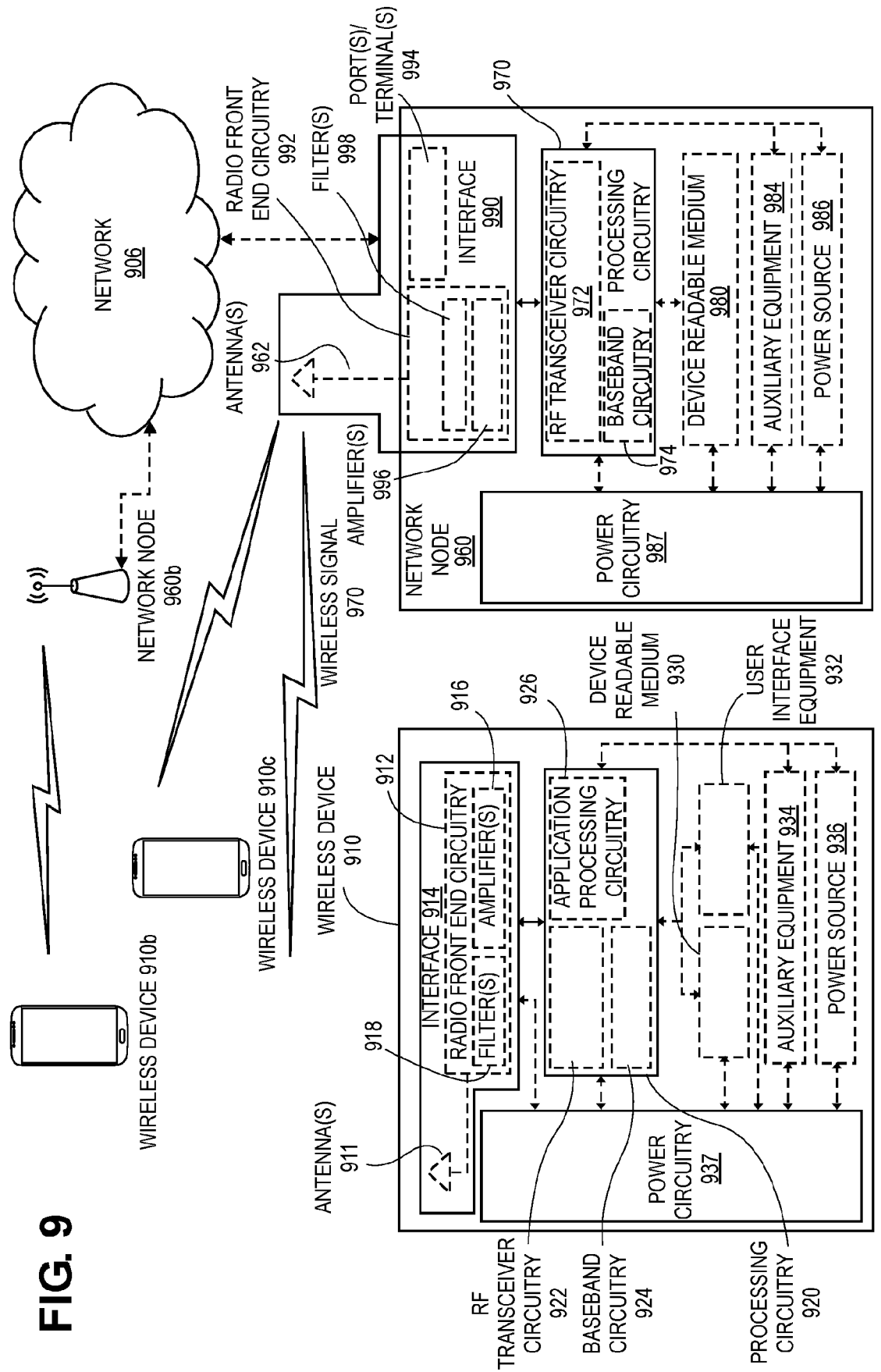
FIG. 9 is a diagram of one embodiment of a wireless network for supporting XR overlay services.

FIG. 9 is a diagram of one embodiment of a wireless network in accordance with some embodiments to provide XR overlay services. Although the subject matter described herein may be implemented in any appropriate type of system using any suitable components, the embodiments disclosed herein are described in relation to a wireless network, such as the example wireless network illustrated in FIG. 9. For simplicity, the wireless network of FIG. 9 only depicts network 906, network nodes 960 and 960b, and WDs 910, 910b, and 910c. In practice, a wireless network may further include any additional elements suitable to support communication between wireless devices or between a wireless device and another communication device, such as a landline telephone, a service provider, or any other network node or end device. Of the illustrated components, network node 960 and wireless device (WD) 910 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network, or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMAX), Bluetooth, Z-Wave and/or ZigBee standards.

Network 906 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 960 and WD 910 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 9, network node 960 includes processing circuitry 970, device readable medium 980, interface 990, auxiliary equipment 984, power source 986, power circuitry 987, and antenna 962. Although network node 960 illustrated in the example wireless network of FIG. 9 may represent a device that includes the illustrated combination of hardware components, other embodiments may comprise network nodes with different combinations of components. It is to be understood that a network node comprises any suitable combination of hardware and/or software needed to perform the tasks, features, functions, and methods disclosed herein. Moreover, while the components of network node 960 are depicted as single boxes located within a larger box, or nested within multiple boxes, in practice, a network node may comprise multiple different physical components that make up a single illustrated component (e.g., device readable medium 980 may comprise multiple separate hard drives as well as multiple RAM modules).

Similarly, network node 960 may be composed of multiple physically separate components (e.g., a NodeB component and an RNC component, or a BTS component and a BSC component, etc.), which may each have their own respective components. In certain scenarios in which network node 960 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 960 may be configured to support multiple radio access technologies (RATs). In such embodiments, some components may be duplicated (e.g., separate device readable medium 980 for the different RATs) and some components may be reused (e.g., the same antenna 962 may be shared by the RATs). Network node 960 may also include multiple sets of the various illustrated components for different wireless technologies integrated into network node 960, such as, for example, GSM, WCDMA, LTE, NR, Wi-Fi, or Bluetooth wireless technologies. These wireless technologies may be integrated into the same or different chip or set of chips and other components within network node 960.

Processing circuitry 970 is configured to perform any determining, calculating, or similar operations (e.g., certain obtaining operations) described herein as being provided by a network node. These operations performed by processing circuitry 970 may include processing information obtained by processing circuitry 970 by, for example, converting the obtained information into other information, comparing the obtained information or converted information to information stored in the network node, and/or performing one or more operations based on the obtained information or converted information, and as a result of said processing making a determination.

Processing circuitry 970 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 960 components, such as device readable medium 980, network node 960 functionality. For example, processing circuitry 970 may execute instructions stored in device readable medium 980 or in memory within processing circuitry 970. Such functionality may include providing any of the various wireless features, functions, or benefits discussed herein. In some embodiments, processing circuitry 970 may include a system on a chip (SOC).

In some embodiments, processing circuitry 970 may include one or more of radio frequency (RF) transceiver circuitry 972 and baseband processing circuitry 974. In some embodiments, radio frequency (RF) transceiver circuitry 972 and baseband processing circuitry 974 may be on separate chips (or sets of chips), boards, or units, such as radio units and digital units. In alternative embodiments, part, or all of RF transceiver circuitry 972 and baseband processing circuitry 974 may be on the same chip or set of chips, boards, or units.

In certain embodiments, some or all of the functionality described herein as being provided by a network node, base station, eNB or other such network device may be performed by processing circuitry 970 executing instructions stored on device readable medium 980 or memory within processing circuitry 970. In alternative embodiments, some or all of the functionality may be provided by processing circuitry 970 without executing instructions stored on a separate or discrete device readable medium, such as in a hard-wired manner. In any of those embodiments, whether executing instructions stored on a device readable storage medium or not, processing circuitry 970 can be configured to perform the described functionality. The benefits provided by such functionality are not limited to processing circuitry 970 alone or to other components of network node 960 but are enjoyed by network node 960 as a whole, and/or by end users and the wireless network generally.

Device readable medium 980 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 970. Device readable medium 980 may store any suitable instructions, data or information, including a computer program, software, an application including one or more of logic, rules, code, tables, etc. and/or other instructions capable of being executed by processing circuitry 970 and, utilized by network node 960. Device readable medium 980 may be used to store any calculations made by processing circuitry 970 and/or any data received via interface 990. In some embodiments, processing circuitry 970 and device readable medium 980 may be considered to be integrated.

Interface 990 is used in the wired or wireless communication of signaling and/or data between network node 960, network 906, and/or WDs 910. As illustrated, interface 990 comprises port(s)/terminal(s) 994 to send and receive data, for example to and from network 906 over a wired connection. Interface 990 also includes radio front end circuitry 992 that may be coupled to, or in certain embodiments a part of, antenna 962. Radio front end circuitry 992 comprises filters 998 and amplifiers 996. Radio front end circuitry 992 may be connected to antenna 962 and processing circuitry 970.

Radio front end circuitry may be configured to condition signals communicated between antenna 962 and processing circuitry 970. Radio front end circuitry 992 may receive digital data that is to be sent out to other network nodes or WDs via a wireless connection. Radio front end circuitry 992 may convert the digital data into a radio signal having the appropriate channel and bandwidth parameters using a combination of filters 998 and/or amplifiers 996. The radio signal may then be transmitted via antenna 962. Similarly, when receiving data, antenna 962 may collect radio signals which are then converted into digital data by radio front end circuitry 992. The digital data may be passed to processing circuitry 970. In other embodiments, the interface may comprise different components and/or different combinations of components.

In certain alternative embodiments, network node 960 may not include separate radio front end circuitry 992, instead, processing circuitry 970 may comprise radio front end circuitry and may be connected to antenna 962 without separate radio front end circuitry 992. Similarly, in some embodiments, all, or some of RF transceiver circuitry 972 may be considered a part of interface 990. In still other embodiments, interface 990 may include one or more ports or terminals 994, radio front end circuitry 992, and RF transceiver circuitry 972, as part of a radio unit (not shown), and interface 990 may communicate with baseband processing circuitry 974, which is part of a digital unit (not shown).

Antenna 962 may include one or more antennas, or antenna arrays, configured to send and/or receive wireless signals. Antenna 962 may be coupled to radio front end circuitry 990 and may be any type of antenna capable of transmitting and receiving data and/or signals wirelessly. In some embodiments, antenna 962 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 962 may be separate from network node 960 and may be connectable to network node 960 through an interface or port.

Antenna 962, interface 990, and/or processing circuitry 970 may be configured to perform any receiving operations and/or certain obtaining operations described herein as being performed by a network node. Any information, data and/or signals may be received from a wireless device, another network node, and/or any other network equipment. Similarly, antenna 962, interface 990, and/or processing circuitry 970 may be configured to perform any transmitting operations described herein as being performed by a network node. Any information, data and/or signals may be transmitted to a wireless device, another network node, and/or any other network equipment.

Power circuitry 987 may comprise, or be coupled to, power management circuitry and is configured to supply the components of network node 960 with power for performing the functionality described herein. Power circuitry 987 may receive power from power source 986. Power source 986 and/or power circuitry 987 may be configured to provide power to the various components of network node 960 in a form suitable for the respective components (e.g., at a voltage and current level needed for each respective component). Power source 986 may either be included in, or external to, power circuitry 987 and/or network node 960. For example, network node 960 may be connectable to an external power source (e.g., an electricity outlet) via an input circuitry or interface such as an electrical cable, whereby the external power source supplies power to power circuitry 987. As a further example, power source 986 may comprise a source of power in the form of a battery or battery pack which is connected to, or integrated in, power circuitry 987. The battery may provide backup power should the external power source fail. Other types of power sources, such as photovoltaic devices, may also be used.

Alternative embodiments of network node 960 may include additional components beyond those shown in FIG. 9 that may be responsible for providing certain aspects of the network node's functionality, including any of the functionality described herein and/or any functionality necessary to support the subject matter described herein. For example, network node 960 may include user interface equipment to allow input of information into network node 960 and to allow output of information from network node 960. This may allow a user to perform diagnostic, maintenance, repair, and other administrative functions for network node 960.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g., refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 910 includes antenna 911, interface 914, processing circuitry 920, device readable medium 930, user interface equipment 932, auxiliary equipment 934, power source 936 and power circuitry 937. WD 910 may include multiple sets of one or more of the illustrated components for different wireless technologies supported by WD 910, such as, for example, GSM, WCDMA, LTE, NR, Wi-Fi, WiMAX, or Bluetooth wireless technologies, just to mention a few. These wireless technologies may be integrated into the same or different chips or set of chips as other components within WD 910.

Antenna 911 may include one or more antennas or antenna arrays, configured to send, and/or receive wireless signals, and is connected to interface 914. In certain alternative embodiments, antenna 911 may be separate from WD 910 and be connectable to WD 910 through an interface or port. Antenna 911, interface 914, and/or processing circuitry 920 may be configured to perform any receiving or transmitting operations described herein as being performed by a WD. Any information, data and/or signals may be received from a network node and/or another WD. In some embodiments, radio front end circuitry and/or antenna 911 may be considered an interface.

As illustrated, interface 914 comprises radio front end circuitry 912 and antenna 911. Radio front end circuitry 912 comprise one or more filters 918 and amplifiers 916. Radio front end circuitry 914 is connected to antenna 911 and processing circuitry 920, and is configured to condition signals communicated between antenna 911 and processing circuitry 920. Radio front end circuitry 912 may be coupled to or a part of antenna 911. In some embodiments, WD 910 may not include separate radio front end circuitry 912; rather, processing circuitry 920 may comprise radio front end circuitry and may be connected to antenna 911. Similarly, in some embodiments, some, or all of RF transceiver circuitry 922 may be considered a part of interface 914. Radio front end circuitry 912 may receive digital data that is to be sent out to other network nodes or WDs via a wireless connection. Radio front end circuitry 912 may convert the digital data into a radio signal having the appropriate channel and bandwidth parameters using a combination of filters 918 and/or amplifiers 916. The radio signal may then be transmitted via antenna 911. Similarly, when receiving data, antenna 911 may collect radio signals which are then converted into digital data by radio front end circuitry 912. The digital data may be passed to processing circuitry 920. In other embodiments, the interface may comprise different components and/or different combinations of components.

Processing circuitry 920 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 910 components, such as device readable medium 930, WD 910 functionality. Such functionality may include providing any of the various wireless features or benefits discussed herein. For example, processing circuitry 920 may execute instructions stored in device readable medium 930 or in memory within processing circuitry 920 to provide the functionality disclosed herein.

As illustrated, processing circuitry 920 includes one or more of RF transceiver circuitry 922, baseband processing circuitry 924, and application processing circuitry 926. In other embodiments, the processing circuitry may comprise different components and/or different combinations of components. In certain embodiments processing circuitry 920 of WD 910 may comprise a SOC. In some embodiments, RF transceiver circuitry 922, baseband processing circuitry 924, and application processing circuitry 926 may be on separate chips or sets of chips. In alternative embodiments, part, or all of baseband processing circuitry 924 and application processing circuitry 926 may be combined into one chip or set of chips, and RF transceiver circuitry 922 may be on a separate chip or set of chips. In still alternative embodiments, part, or all of RF transceiver circuitry 922 and baseband processing circuitry 924 may be on the same chip or set of chips, and application processing circuitry 926 may be on a separate chip or set of chips. In yet other alternative embodiments, part, or all of RF transceiver circuitry 922, baseband processing circuitry 924, and application processing circuitry 926 may be combined in the same chip or set of chips. In some embodiments, RF transceiver circuitry 922 may be a part of interface 914. RF transceiver circuitry 922 may condition RF signals for processing circuitry 920.

In certain embodiments, some or all of the functionality described herein as being performed by a WD may be provided by processing circuitry 920 executing instructions stored on device readable medium 930, which in certain embodiments may be a computer-readable storage medium. In alternative embodiments, some or all of the functionality may be provided by processing circuitry 920 without executing instructions stored on a separate or discrete device readable storage medium, such as in a hard-wired manner. In any of those particular embodiments, whether executing instructions stored on a device readable storage medium or not, processing circuitry 920 can be configured to perform the described functionality. The benefits provided by such functionality are not limited to processing circuitry 920 alone or to other components of WD 910, but are enjoyed by WD 910 as a whole, and/or by end users and the wireless network generally.

Processing circuitry 920 may be configured to perform any determining, calculating, or similar operations (e.g., certain obtaining operations) described herein as being performed by a WD. These operations, as performed by processing circuitry 920, may include processing information obtained by processing circuitry 920 by, for example, converting the obtained information into other information, comparing the obtained information or converted information to information stored by WD 910, and/or performing one or more operations based on the obtained information or converted information, and as a result of said processing making a determination.

Device readable medium 930 may be operable to store a computer program, software, an application including one or more of logic, rules, code, tables, etc. and/or other instructions capable of being executed by processing circuitry 920. Device readable medium 930 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 920. In some embodiments, processing circuitry 920 and device readable medium 930 may be considered to be integrated.

User interface equipment 932 may provide components that allow for a human user to interact with WD 910. Such interaction may be of many forms, such as visual, audial, tactile, etc. User interface equipment 932 may be operable to produce output to the user and to allow the user to provide input to WD 910. The type of interaction may vary depending on the type of user interface equipment 932 installed in WD 910. For example, if WD 910 is a smart phone, the interaction may be via a touch screen; if WD 910 is a smart meter, the interaction may be through a screen that provides usage (e.g., the number of gallons used) or a speaker that provides an audible alert (e.g., if smoke is detected). User interface equipment 932 may include input interfaces, devices and circuits, and output interfaces, devices, and circuits. User interface equipment 932 is configured to allow input of information into WD 910, and is connected to processing circuitry 920 to allow processing circuitry 920 to process the input information. User interface equipment 932 may include, for example, a microphone, a proximity or other sensor, keys/buttons, a touch display, one or more cameras, a USB port, or other input circuitry. User interface equipment 932 is also configured to allow output of information from WD 910, and to allow processing circuitry 920 to output information from WD 910. User interface equipment 932 may include, for example, a speaker, a display, vibrating circuitry, a USB port, a headphone interface, or other output circuitry. Using one or more input and output interfaces, devices, and circuits, of user interface equipment 932, WD 910 may communicate with end users and/or the wireless network, and allow them to benefit from the functionality described herein.

Auxiliary equipment 934 is operable to provide more specific functionality which may not be generally performed by WDs. This may comprise specialized sensors for doing measurements for various purposes, interfaces for additional types of communication such as wired communications etc. The inclusion and type of components of auxiliary equipment 934 may vary depending on the embodiment and/or scenario.

Power source 936 may, in some embodiments, be in the form of a battery or battery pack. Other types of power sources, such as an external power source (e.g., an electricity outlet), photovoltaic devices or power cells, may also be used. WD 910 may further comprise power circuitry 937 for delivering power from power source 936 to the various parts of WD 910 which need power from power source 936 to carry out any functionality described or indicated herein. Power circuitry 937 may in certain embodiments comprise power management circuitry. Power circuitry 937 may additionally or alternatively be operable to receive power from an external power source; in which case WD 910 may be connectable to the external power source (such as an electricity outlet) via input circuitry or an interface such as an electrical power cable. Power circuitry 937 may also in certain embodiments be operable to deliver power from an external power source to power source 936. This may be, for example, for the charging of power source 936. Power circuitry 937 may perform any formatting, converting, or other modification to the power from power source 936 to make the power suitable for the respective components of WD 910 to which power is supplied.

Figure 10:
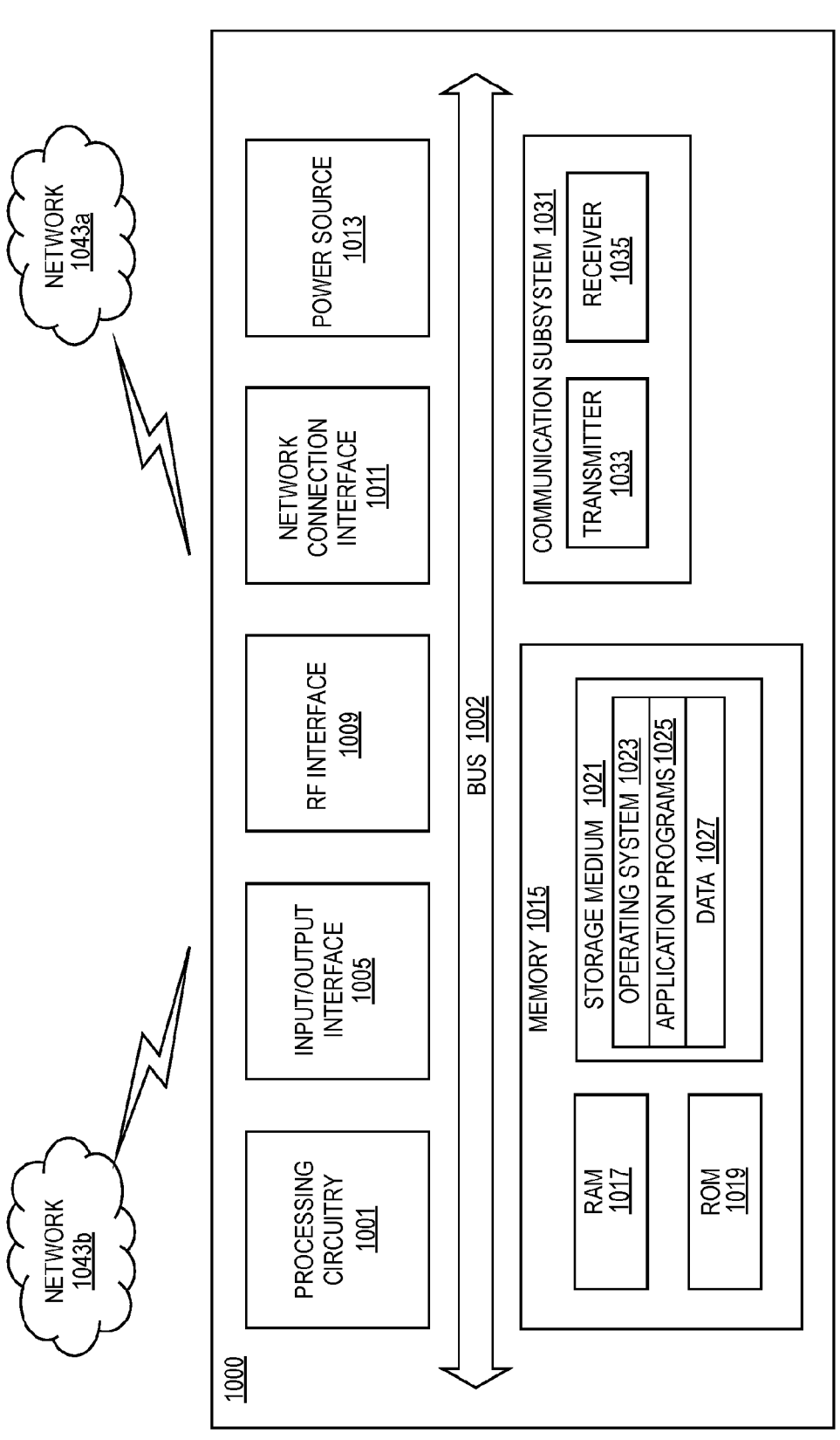
FIG. 10 is a diagram of one embodiment of user equipment for supporting XR overlay services.

FIG. 10 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 10200 may be any UE identified by the 3$^{rd}$ Generation Partnership Project (3GPP), including a NB-IoT UE, a machine type communication (MTC) UE, and/or an enhanced MTC (eMTC) UE. UE 1000, as illustrated in FIG. 10, is one example of a WD configured for communication in accordance with one or more communication standards promulgated by the 3$^{rd}$ Generation Partnership Project (3GPP), such as 3GPP's GSM, UMTS, LTE, and/or 5G standards. As mentioned previously, the term WD and UE may be used interchangeable. Accordingly, although FIG. 10 is a UE, the components discussed herein are equally applicable to a WD, and vice-versa.

In FIG. 10, UE 1000 includes processing circuitry 1001 that is operatively coupled to input/output interface 1005, radio frequency (RF) interface 1009, network connection interface 1011, memory 1015 including random access memory (RAM) 1017, read-only memory (ROM) 1019, and storage medium 1021 or the like, communication subsystem 1031, power source 1033, and/or any other component, or any combination thereof. Storage medium 1021 includes operating system 1023, application program 1025, and data 1027. In other embodiments, storage medium 1021 may include other similar types of information. Certain UEs may utilize all of the components shown in FIG. 10, or only a subset of the components. The level of integration between the components may vary from one UE to another UE. Further, certain UEs may contain multiple instances of a component, such as multiple processors, memories, transceivers, transmitters, receivers, etc.

In FIG. 10, processing circuitry 1001 may be configured to process computer instructions and data. Processing circuitry 1001 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1001 may include two central processing units (CPUs). Data may be information in a form suitable for use by a computer.

In the depicted embodiment, input/output interface 1005 may be configured to provide a communication interface to an input device, output device, or input and output device. UE 1000 may be configured to use an output device via input/output interface 1005. An output device may use the same type of interface port as an input device. For example, a USB port may be used to provide input to and output from UE 1000. The output device may be a speaker, a sound card, a video card, a display, a monitor, a printer, an actuator, an emitter, a smartcard, another output device, or any combination thereof. UE 1000 may be configured to use an input device via input/output interface 1005 to allow a user to capture information into UE 1000. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 10, RF interface 1009 may be configured to provide a communication interface to RF components such as a transmitter, a receiver, and an antenna. Network connection interface 1011 may be configured to provide a communication interface to network 1043a. Network 1043a may encompass wired and/or wireless networks such as a local-area network (LAN), a wide-area network (WAN), a computer network, a wireless network, a telecommunications network, another like network or any combination thereof. For example, network 1043a may comprise a Wi-Fi network. Network connection interface 1011 may be configured to include a receiver and a transmitter interface used to communicate with one or more other devices over a communication network according to one or more communication protocols, such as Ethernet, TCP/IP, SONET, ATM, or the like. Network connection interface 1011 may implement receiver and transmitter functionality appropriate to the communication network links (e.g., optical, electrical, and the like). The transmitter and receiver functions may share circuit components, software, or firmware, or alternatively may be implemented separately.

RAM 1017 may be configured to interface via bus 1002 to processing circuitry 1001 to provide storage or caching of data or computer instructions during the execution of software programs such as the operating system, application programs, and device drivers. ROM 1019 may be configured to provide computer instructions or data to processing circuitry 1001. For example, ROM 1019 may be configured to store invariant low-level system code or data for basic system functions such as basic input and output (I/O), startup, or reception of keystrokes from a keyboard that are stored in a non-volatile memory. Storage medium 1021 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1021 may be configured to include operating system 1023, application program 1025 such as a web browser application, a widget or gadget engine or another application, and data file 1027. Storage medium 1021 may store, for use by UE 1000, any of a variety of various operating systems or combinations of operating systems.

Storage medium 1021 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1021 may allow UE 1000 to access computer-executable instructions, application programs or the like, stored on transitory or non-transitory memory media, to off-load data, or to upload data. An article of manufacture, such as one utilizing a communication system may be tangibly embodied in storage medium 1021, which may comprise a device readable medium.

In FIG. 10, processing circuitry 1001 may be configured to communicate with network 1043b using communication subsystem 1031. Network 1043a and network 1043b may be the same network or networks or different network or networks. Communication subsystem 1031 may be configured to include one or more transceivers used to communicate with network 1043b. For example, communication subsystem 1031 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMAX, or the like. Each transceiver may include transmitter 1033 and/or receiver 1035 to implement transmitter or receiver functionality, respectively, appropriate to the RAN links (e.g., frequency allocations and the like). Further, transmitter 1033 and receiver 1035 of each transceiver may share circuit components, software, or firmware, or alternatively may be implemented separately.

In the illustrated embodiment, the communication functions of communication subsystem 1031 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1031 may include cellular communication, Wi-Fi communication, Bluetooth communication, and GPS communication. Network 1043b may encompass wired and/or wireless networks such as a local-area network (LAN), a wide-area network (WAN), a computer network, a wireless network, a telecommunications network, another like network or any combination thereof. For example, network 1043b may be a cellular network, a Wi-Fi network, and/or a near-field network. Power source 1013 may be configured to provide alternating current (AC) or direct current (DC) power to components of UE 1000.

The features, benefits and/or functions described herein may be implemented in one of the components of UE 1000 or partitioned across multiple components of UE 1000. Further, the features, benefits, and/or functions described herein may be implemented in any combination of hardware, software, or firmware. In one example, communication subsystem 1031 may be configured to include any of the components described herein. Further, processing circuitry 1001 may be configured to communicate with any of such components over bus 1002. In another example, any of such components may be represented by program instructions stored in memory that when executed by processing circuitry 1001 perform the corresponding functions described herein. In another example, the functionality of any of such components may be partitioned between processing circuitry 1001 and communication subsystem 1031. In another example, the non-computationally intensive functions of any of such components may be implemented in software or firmware and the computationally intensive functions may be implemented in hardware.

Figure 11:
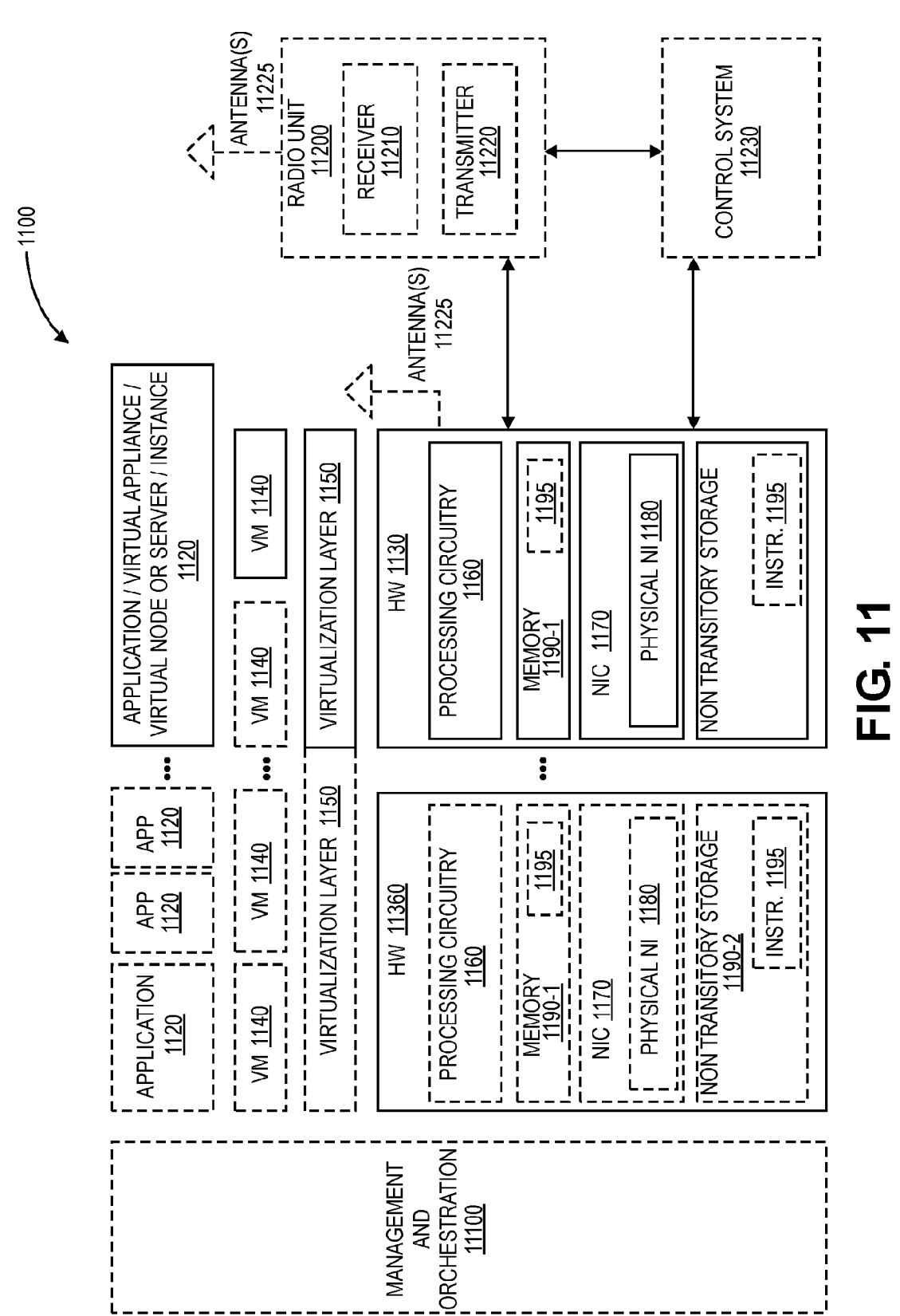
FIG. 11 is a diagram of one embodiment of a virtualization environment for supporting XR overlay services.

FIG. 11 is a schematic block diagram illustrating a virtualization environment 1100 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1100 hosted by one or more of hardware nodes 1130. Further, in embodiments in which the virtual node is not a radio access node or does not require radio connectivity (e.g., a core network node), then the network node may be entirely virtualized.

The functions may be implemented by one or more applications 1120 (which may alternatively be called software instances, virtual appliances, network functions, virtual nodes, virtual network functions, etc.) operative to implement some of the features, functions, and/or benefits of some of the embodiments disclosed herein. Applications 1120 are run in virtualization environment 1100 which provides hardware 1130 comprising processing circuitry 1160 and memory 1190. Memory 1190 contains instructions 1195 executable by processing circuitry 1160 whereby application 1120 is operative to provide one or more of the features, benefits, and/or functions disclosed herein.

Virtualization environment 1100, comprises general-purpose or special-purpose network hardware devices 1130 comprising a set of one or more processors or processing circuitry 1160, which may be commercial off-the-shelf (COTS) processors, dedicated Application Specific Integrated Circuits (ASICs), or any other type of processing circuitry including digital or analog hardware components or special purpose processors. Each hardware device may comprise memory 1190-1 which may be non-persistent memory for temporarily storing instructions 1195 or software executed by processing circuitry 1160. Each hardware device may comprise one or more network interface controllers (NICs) 1170, also known as network interface cards, which include physical network interface 1180. Each hardware device may also include non-transitory, persistent, machine-readable storage media 1190-2 having stored therein software 1195 and/or instructions executable by processing circuitry 1160. Software 1195 may include any type of software including software for instantiating one or more virtualization layers 1150 (also referred to as hypervisors), software to execute virtual machines 1140 as well as software allowing it to execute functions, features and/or benefits described in relation with some embodiments described herein.

Virtual machines 1140, comprise virtual processing, virtual memory, virtual networking or interface and virtual storage, and may be run by a corresponding virtualization layer 1150 or hypervisor. Different embodiments of the instance of virtual appliance 1120 may be implemented on one or more of virtual machines 1140, and the implementations may be made in different ways.

During operation, processing circuitry 1160 executes software 1195 to instantiate the hypervisor or virtualization layer 1150, which may sometimes be referred to as a virtual machine monitor (VMM). Virtualization layer 1150 may present a virtual operating platform that appears like networking hardware to virtual machine 1140.

As shown in FIG. 11, hardware 1130 may be a standalone network node with generic or specific components. Hardware 1130 may comprise antenna 11225 and may implement some functions via virtualization. Alternatively, hardware 1130 may be part of a larger cluster of hardware (e.g., such as in a data center or customer premise equipment (CPE)) where many hardware nodes work together and are managed via management and orchestration (MANO) 11100, which, among others, oversees lifecycle management of applications 1120.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1140 may be a software implementation of a physical machine that runs programs as if they were executing on a physical, non-virtualized machine. Each of virtual machines 1140, and that part of hardware 1130 that executes that virtual machine, be it hardware dedicated to that virtual machine and/or hardware shared by that virtual machine with others of the virtual machines 1140, forms a separate virtual network elements (VNE).

Still in the context of NFV, Virtual Network Function (VNF) is responsible for handling specific network functions that run in one or more virtual machines 1140 on top of hardware networking infrastructure 1130 and corresponds to application 1120 in FIG. 11.

In some embodiments, one or more radio units 11200 that each include one or more transmitters 11220 and one or more receivers 11210 may be coupled to one or more antennas 11225. Radio units 11200 may communicate directly with hardware nodes 1130 via one or more appropriate network interfaces and may be used in combination with the virtual components to provide a virtual node with radio capabilities, such as a radio access node or a base station.

In some embodiments, some signaling can be affected with the use of control system 11230 which may alternatively be used for communication between the hardware nodes 1130 and radio units 11200.

FIG. 12A illustrates connectivity between network devices (NDs) within an exemplary network, as well as three exemplary implementations of the NDs, according to some embodiments of the invention. FIG. 12A shows NDs 1200A-H, and their connectivity by way of lines between 1200A-1200B, 1200B-1200C, 1200C-1200D, 1200D-1200E, 1200E-1200F, 1200F-1200G, and 1200A-1200G, as well as between 1200H and each of 1200A, 1200C, 1200D, and 1200G. These NDs are physical devices, and the connectivity between these NDs can be wireless or wired (often referred to as a link). An additional line extending from NDs 1200A, 1200E, and 1200F illustrates that these NDs act as ingress and egress points for the network (and thus, these NDs are sometimes referred to as edge NDs; while the other NDs may be called core NDs).

Two of the exemplary ND implementations in FIG. 12A are: 1) a special-purpose network device 1202 that uses custom application—specific integrated—circuits (ASICs)

and a special-purpose operating system (OS); and 2) a general purpose network device 1204 that uses common off-the-shelf (COTS) processors and a standard OS.

The special-purpose network device 1202 includes networking hardware 1210 comprising a set of one or more processor(s) 1212, forwarding resource(s) 1214 (which typically include one or more ASICs and/or network processors), and physical network interfaces (NIs) 1216 (through which network connections are made, such as those shown by the connectivity between NDs 1200A-H), as well as non-transitory machine readable storage media 1218 having stored therein networking software 1220. During operation, the networking software 1220 may be executed by the networking hardware 1210 to instantiate a set of one or more networking software instance(s) 1222. Each of the networking software instance(s) 1222, and that part of the networking hardware 1210 that executes that network software instance (be it hardware dedicated to that networking software instance and/or time slices of hardware temporally shared by that networking software instance with others of the networking software instance(s) 1222), form a separate virtual network element 1230A-R. Each of the virtual network element(s) (VNEs) 1230A-R includes a control communication and configuration module 1232A-R (sometimes referred to as a local control module or control communication module) and forwarding table(s) 1234A-R, such that a given virtual network element (e.g., 1230A) includes the control communication and configuration module (e.g., 1232A), a set of one or more forwarding table(s) (e.g., 1234A), and that portion of the networking hardware 1210 that executes the virtual network element (e.g., 1230A). In some embodiments, the networking software can include aspects of the XR overlay services 1265. Any component of the XR overlay services 1265 can be implemented in the networking software 1220.

The special-purpose network device 1202 is often physically and/or logically considered to include: 1) a ND control plane 1224 (sometimes referred to as a control plane) comprising the processor(s) 1212 that execute the control communication and configuration module(s) 1232A-R; and 2) a ND forwarding plane 1226 (sometimes referred to as a forwarding plane, a data plane, or a media plane) comprising the forwarding resource(s) 1214 that utilize the forwarding table(s) 1234A-R and the physical NIs 1216. By way of example, where the ND is a router (or is implementing routing functionality), the ND control plane 1224 (the processor(s) 1212 executing the control communication and configuration module(s) 1232A-R) is typically responsible for participating in controlling how data (e.g., packets) is to be routed (e.g., the next hop for the data and the outgoing physical NI for that data) and storing that routing information in the forwarding table(s) 1234A-R, and the ND forwarding plane 1226 is responsible for receiving that data on the physical NIs 1216 and forwarding that data out the appropriate ones of the physical NIs 1216 based on the forwarding table(s) 1234A-R.

FIG. 12B illustrates an exemplary way to implement the special-purpose network device 1202 according to some embodiments of the invention. FIG. 12B shows a special-purpose network device including cards 1238 (typically hot pluggable). While in some embodiments the cards 1238 are of two types (one or more that operate as the ND forwarding plane 1226 (sometimes called line cards), and one or more that operate to implement the ND control plane 1224 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/ Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 1236 (e.g., a first full mesh coupling the line cards and a second full mesh coupling all of the cards).

Returning to FIG. 12A, the general purpose network device 1204 includes hardware 1240 comprising a set of one or more processor(s) 1242 (which are often COTS processors) and physical NIs 1246, as well as non-transitory machine readable storage media 1248 having stored therein software 1250. During operation, the processor(s) 1242 execute the software 1250 to instantiate one or more sets of one or more applications 1264A-R. While one embodiment does not implement virtualization, alternative embodiments may use different forms of virtualization. For example, in one such alternative embodiment the virtualization layer 1254 represents the kernel of an operating system (or a shim executing on a base operating system) that allows for the creation of multiple instances 1262A-R called software containers that may each be used to execute one (or more) of the sets of applications 1264A-R; where the multiple software containers (also called virtualization engines, virtual private servers, or jails) are user spaces (typically a virtual memory space) that are separate from each other and separate from the kernel space in which the operating system is run; and where the set of applications running in a given user space, unless explicitly allowed, cannot access the memory of the other processes. In another such alternative embodiment the virtualization layer 1254 represents a hypervisor (sometimes referred to as a virtual machine monitor (VMM)) or a hypervisor executing on top of a host operating system, and each of the sets of applications 1264A-R is run on top of a guest operating system within an instance 1262A-R called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 1240, directly on a hypervisor (in which case the unikernel is sometimes described as running within a LibOS virtual machine), or in a software container, embodiments can be implemented fully with unikernels running directly on a hypervisor represented by virtualization layer 1254, unikernels running within software containers represented by instances 1262A-R, or as a combination of unikernels and the above-described techniques (e.g., unikernels and virtual machines both run directly on a hypervisor, unikernels and sets of applications that are run in different software containers).

The instantiation of the one or more sets of one or more applications 1264A-R, as well as virtualization if implemented, are collectively referred to as software instance(s) 1252. Each set of applications 1264A-R, corresponding virtualization construct (e.g., instance 1262A-R) if implemented, and that part of the hardware 1240 that executes them (be it hardware dedicated to that execution and/or time slices of hardware temporally shared), forms a separate virtual network element(s) 1260A-R. In some embodiments, the applications 1264A-R, and the software 1250 can encompass elements of the XR overlay services 1265. Any component or function of the XR overlay services 1265 can be implemented as applications 1264A-R and as part of the software 1250.

The virtual network element(s) 1260A-R perform similar functionality to the virtual network element(s) 1230A-R— e.g., similar to the control communication and configuration module(s) 1232A and forwarding table(s) 1234A (this virtualization of the hardware 1240 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). While embodiments of the invention are illustrated with each instance 1262A-R corresponding to one VNE 1260A-R, alternative embodiments may implement this correspondence at a finer level granularity (e.g., line card virtual machines virtualize line cards, control card virtual machine virtualize control cards, etc.); it should be understood that the techniques described herein with reference to a correspondence of instances 1262A-R to VNEs also apply to embodiments where such a finer level of granularity and/or unikernels are used.

In certain embodiments, the virtualization layer 1254 includes a virtual switch that provides similar forwarding services as a physical Ethernet switch. Specifically, this virtual switch forwards traffic between instances 1262A-R and the physical NI(s) 1246, as well as optionally between the instances 1262A-R; in addition, this virtual switch may enforce network isolation between the VNEs 1260A-R that by policy are not permitted to communicate with each other (e.g., by honoring virtual local area networks (VLANs)).

The third exemplary ND implementation in FIG. 12A is a hybrid network device 1206, which includes both custom ASICs/special-purpose OS and COTS processors/standard OS in a single ND or a single card within an ND. In certain embodiments of such a hybrid network device, a platform VM (i.e., a VM that that implements the functionality of the special-purpose network device 1202) could provide for para-virtualization to the networking hardware present in the hybrid network device 1206.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 1230A-R, VNEs 1260A-R, and those in the hybrid network device 1206) receives data on the physical NIs (e.g., 1216, 1246) and forwards that data out the appropriate ones of the physical Ms (e.g., 1216, 1246). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services code point (DSCP) values.

FIG. 12C illustrates various exemplary ways in which VNEs may be coupled according to some embodiments of the invention. FIG. 12C shows VNEs 1270A.1-1270A.P (and optionally VNEs 1270A.Q-1270A.R) implemented in ND 1200A and VNE 1270H.1 in ND 1200H. In FIG. 12C, VNEs 1270A.1-P are separate from each other in the sense that they can receive packets from outside ND 1200A and forward packets outside of ND 1200A; VNE 1270A.1 is coupled with VNE 1270H.1, and thus they communicate packets between their respective NDs; VNE 1270A.2-1270A.3 may optionally forward packets between themselves without forwarding them outside of the ND 1200A; and VNE 1270A.P may optionally be the first in a chain of VNEs that includes VNE 1270A.Q followed by VNE 1270A.R (this is sometimes referred to as dynamic service chaining, where each of the VNEs in the series of VNEs provides a different service—e.g., one or more layer 4-7 network services). While FIG. 12C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 12A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 12A may also host one or more such servers (e.g., in the case of the general purpose network device 1204, one or more of the software instances 1262A-R may operate as servers; the same would be true for the hybrid network device 1206; in the case of the special-purpose network device 1202, one or more such servers could also be run on a virtualization layer executed by the processor(s) 1212); in which case the servers are said to be co-located with the VNEs of that ND.

A virtual network is a logical abstraction of a physical network (such as that in FIG. 12A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

FIG. 12D illustrates a network with a single network element on each of the NDs of FIG. 12A, and within this straight forward approach contrasts a traditional distributed approach (commonly used by traditional routers) with a centralized approach for maintaining reachability and forwarding information (also called network control), according to some embodiments of the invention. Specifically, FIG. 12D illustrates network elements (NEs) 1270A-H with the same connectivity as the NDs 1200A-H of FIG. 12A.

FIG. 12D illustrates that the distributed approach 1272 distributes responsibility for generating the reachability and forwarding information across the NEs 1270A-H; in other words, the process of neighbor discovery and topology discovery is distributed.

For example, where the special-purpose network device 1202 is used, the control communication and configuration module(s) 1232A-R of the ND control plane 1224 typically include a reachability and forwarding information module to implement one or more routing protocols (e.g., an exterior gateway protocol such as Border Gateway Protocol (BGP), Interior Gateway Protocol(s) (IGP) (e.g., Open Shortest Path First (OSPF), Intermediate System to Intermediate System (IS-IS), Routing Information Protocol (RIP), Label Distribution Protocol (LDP), Resource Reservation Protocol (RSVP) (including RSVP-Traffic Engineering (TE): Extensions to RSVP for LSP Tunnels and Generalized Multi-Protocol Label Switching (GMPLS) Signaling RSVP-TE)) that communicate with other NEs to exchange routes, and then selects those routes based on one or more routing metrics. Thus, the NEs 1270A-H (e.g., the processor(s) 1212 executing the control communication and configuration module(s) 1232A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 1224. The ND control plane 1224 programs the ND forwarding plane 1226 with information (e.g., adjacency and route information) based on the routing structure(s). For example, the ND control plane 1224 programs the adjacency and route information into one or more forwarding table(s) 1234A-R (e.g., Forwarding Information Base (FIB), Label Forwarding Information Base (LFIB), and one or more adjacency structures) on the ND forwarding plane 1226. For layer 2 forwarding, the ND can store one or more bridging tables that are used to forward data based on the layer 2 information in that data. While the above example uses the special-purpose network device 1202, the same distributed approach 1272 can be implemented on the general purpose network device 1204 and the hybrid network device 1206.

FIG. 12D illustrates that a centralized approach 1274 (also known as software defined networking (SDN)) that decouples the system that makes decisions about where traffic is sent from the underlying systems that forwards traffic to the selected destination. The illustrated centralized approach 1274 has the responsibility for the generation of reachability and forwarding information in a centralized control plane 1276 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 1276 has a south bound interface 1282 with a data plane 1280 (sometime referred to the infrastructure layer, network forwarding plane, or forwarding plane (which should not be confused with a ND forwarding plane)) that includes the NEs 1270A-H (sometimes referred to as switches, forwarding elements, data plane elements, or nodes). The centralized control plane 1276 includes a network controller 1278, which includes a centralized reachability and forwarding information module 1279 that determines the reachability within the network and distributes the forwarding information to the NEs 1270A-H of the data plane 1280 over the south bound interface 1282 (which may use the OpenFlow protocol). Thus, the network intelligence is centralized in the centralized control plane 1276 executing on electronic devices that are typically separate from the NDs.

For example, where the special-purpose network device 1202 is used in the data plane 1280, each of the control communication and configuration module(s) 1232A-R of the ND control plane 1224 typically include a control agent that provides the VNE side of the south bound interface 1282. In this case, the ND control plane 1224 (the processor(s) 1212 executing the control communication and configuration module(s) 1232A-R) performs its responsibility for participating in controlling how data (e.g., packets) is to be routed (e.g., the next hop for the data and the outgoing physical NI for that data) through the control agent communicating with the centralized control plane 1276 to receive the forwarding information (and in some cases, the reachability information) from the centralized reachability and forwarding information module 1279 (it should be understood that in some embodiments of the invention, the control communication and configuration module(s) 1232A-R, in addition to communicating with the centralized control plane 1276, may also play some role in determining reachability and/or calculating forwarding information—albeit less so than in the case of a distributed approach; such embodiments are generally considered to fall under the centralized approach 1274, but may also be considered a hybrid approach).

While the above example uses the special-purpose network device 1202, the same centralized approach 1274 can be implemented with the general purpose network device 1204 (e.g., each of the VNE 1260A-R performs its responsibility for controlling how data (e.g., packets) is to be routed (e.g., the next hop for the data and the outgoing physical NI for that data) by communicating with the centralized control plane 1276 to receive the forwarding information (and in some cases, the reachability information) from the centralized reachability and forwarding information module 1279; it should be understood that in some embodiments of the invention, the VNEs 1260A-R, in addition to communicating with the centralized control plane 1276, may also play some role in determining reachability and/or calculating forwarding information—albeit less so than in the case of a distributed approach) and the hybrid network device 1206. In fact, the use of SDN techniques can enhance the NFV techniques typically used in the general purpose network device 1204 or hybrid network device 1206 implementations as NFV is able to support SDN by providing an infrastructure upon which the SDN software can be run, and NFV and SDN both aim to make use of commodity server hardware and physical switches.

FIG. 12D also shows that the centralized control plane 1276 has a north bound interface 1284 to an application layer 1286, in which resides application(s) 1288. The centralized control plane 1276 has the ability to form virtual networks 1292 (sometimes referred to as a logical forwarding plane, network services, or overlay networks (with the NEs 1270A-H of the data plane 1280 being the underlay network)) for the application(s) 1288. Thus, the centralized control plane 1276 maintains a global view of all NDs and configured NEs/VNEs, and it maps the virtual networks to the underlying NDs efficiently (including maintaining these mappings as the physical network changes either through hardware (ND, link, or ND component) failure, addition, or removal). In some embodiments, the applications 1288 can encompass elements of the XR overlay services 1281. Any component or function of the XR overlay services 1281 can be implemented as applications 1288.

While FIG. 12D shows the distributed approach 1272 separate from the centralized approach 1274, the effort of network control may be distributed differently or the two combined in certain embodiments of the invention. For example: 1) embodiments may generally use the centralized approach (SDN) 1274, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 1274, but may also be considered a hybrid approach.

While FIG. 12D illustrates the simple case where each of the NDs 1200A-H implements a single NE 1270A-H, it should be understood that the network control approaches described with reference to FIG. 12D also work for networks where one or more of the NDs 1200A-H implement multiple VNEs (e.g., VNEs 1230A-R, VNEs 1260A-R, those in the hybrid network device 1206). Alternatively, or in addition, the network controller 1278 may also emulate the implementation of multiple VNEs in a single ND. Specifically, instead of (or in addition to) implementing multiple VNEs in a single ND, the network controller 1278 may present the implementation of a VNE/NE in a single ND as multiple VNEs in the virtual networks 1292 (all in the same one of the virtual network(s) 1292, each in different ones of the virtual network(s) 1292, or some combination). For example, the network controller 1278 may cause an ND to implement a single VNE (a NE) in the underlay network, and then logically divide up the resources of that NE within the centralized control plane 1276 to present different VNEs in the virtual network(s) 1292 (where these different VNEs in the overlay networks are sharing the resources of the single VNE/NE implementation on the ND in the underlay network).

On the other hand, FIGS. 12E and 12F respectively illustrate exemplary abstractions of NEs and VNEs that the network controller 1278 may present as part of different ones of the virtual networks 1292. FIG. 12E illustrates the simple case of where each of the NDs 1200A-H implements a single NE 1270A-H (see FIG. 12D), but the centralized control plane 1276 has abstracted multiple of the NEs in different NDs (the NEs 1270A-C and G-H) into (to represent) a single NE 1270I in one of the virtual network(s) 1292 of FIG. 12D, according to some embodiments of the invention. FIG. 12E shows that in this virtual network, the NE 1270I is coupled to NE 1270D and 1270F, which are both still coupled to NE 1270E.

FIG. 12F illustrates a case where multiple VNEs (VNE 1270A.1 and VNE 1270H.1) are implemented on different NDs (ND 1200A and ND 1200H) and are coupled to each other, and where the centralized control plane 1276 has abstracted these multiple VNEs such that they appear as a single VNE 1270T within one of the virtual networks 1292 of FIG. 12D, according to some embodiments of the invention. Thus, the abstraction of a NE or VNE can span multiple NDs.

While some embodiments of the invention implement the centralized control plane 1276 as a single entity (e.g., a single instance of software running on a single electronic device), alternative embodiments may spread the functionality across multiple entities for redundancy and/or scalability purposes (e.g., multiple instances of software running on different electronic devices).

Figure 13:
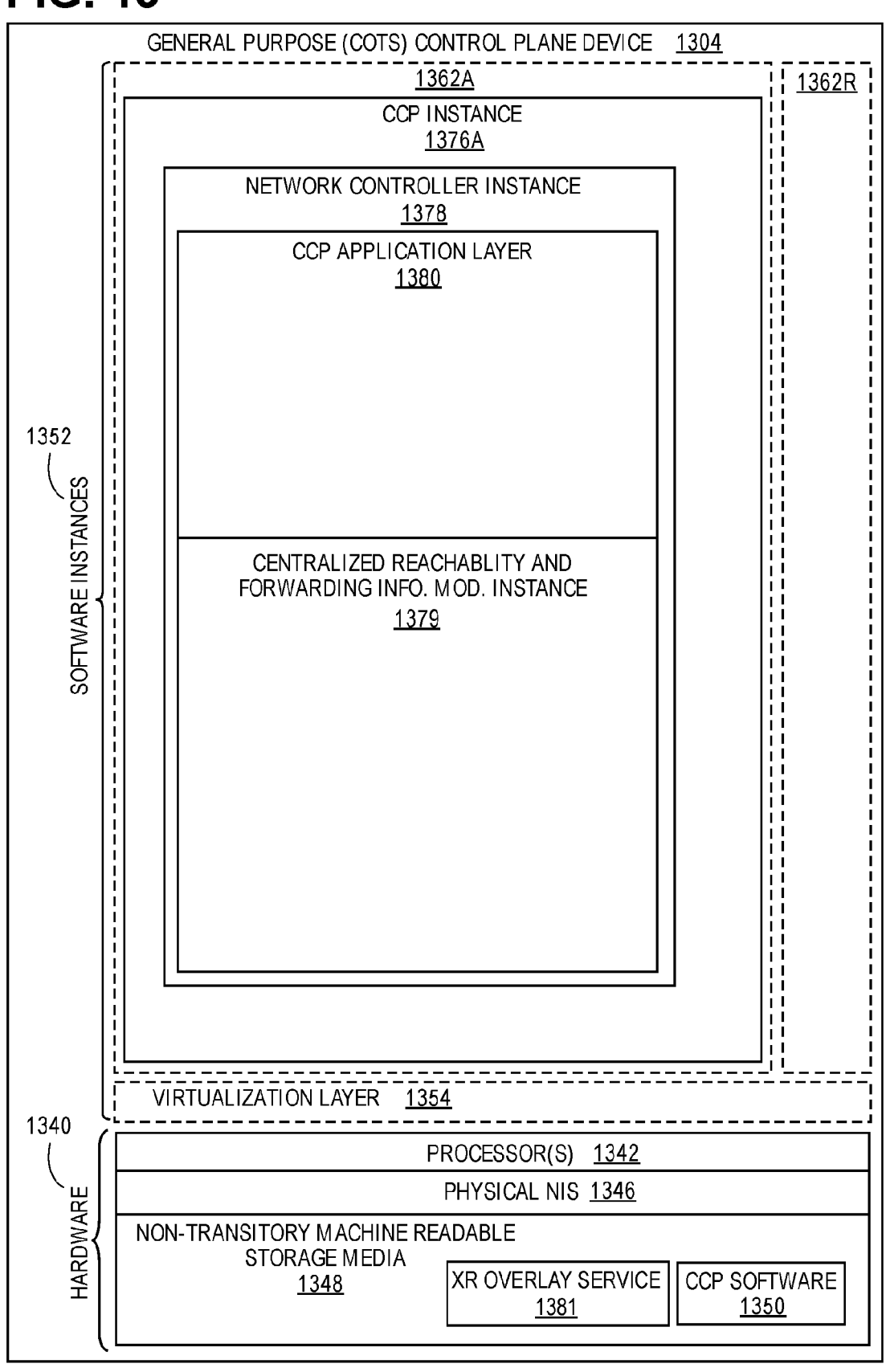
FIG. 13 illustrates a general purpose control plane device with centralized control plane (CCP) software 1350), according to some embodiments of the invention.

Similar to the network device implementations, the electronic device(s) running the centralized control plane 1276, and thus the network controller 1278 including the centralized reachability and forwarding information module 1279, may be implemented a variety of ways (e.g., a special purpose device, a general-purpose (e.g., COTS) device, or hybrid device). These electronic device(s) would similarly include processor(s), a set of one or more physical NIs, and a non-transitory machine-readable storage medium having stored thereon the centralized control plane software. For instance, FIG. 13 illustrates, a general purpose control plane device 1304 including hardware 1340 comprising a set of one or more processor(s) 1342 (which are often COTS processors) and physical NIs 1346, as well as non-transitory machine readable storage media 1348 having stored therein centralized control plane (CCP) software 1350. In some embodiments, the software of the control plane device 1304 and software stored in the storage 1348 can encompass elements of the XR overlay services 1381. Any component or function of the XR overlay services 1381 can be implemented in the control plane device 1304.

In embodiments that use compute virtualization, the processor(s) 1342 typically execute software to instantiate a virtualization layer 1354 (e.g., in one embodiment the virtualization layer 1354 represents the kernel of an operating system (or a shim executing on a base operating system) that allows for the creation of multiple instances 1362A-R called software containers (representing separate user spaces and also called virtualization engines, virtual private servers, or jails) that may each be used to execute a set of one or more applications; in another embodiment the virtualization layer 1354 represents a hypervisor (sometimes referred to as a virtual machine monitor (VMM)) or a hypervisor executing on top of a host operating system, and an application is run on top of a guest operating system within an instance 1362A-R called a virtual machine (which in some cases may be considered a tightly isolated form of software container) that is run by the hypervisor; in another embodiment, an application is implemented as a unikernel, which can be generated by compiling directly with an application only a limited set of libraries (e.g., from a library operating system (LibOS) including drivers/libraries of OS services) that provide the particular OS services needed by the application, and the unikernel can run directly on hardware 1340, directly on a hypervisor represented by virtualization layer 1354 (in which case the unikernel is sometimes described as running within a LibOS virtual machine), or in a software container represented by one of instances 1362A-R). Again, in embodiments where compute virtualization is used, during operation an instance of the CCP software 1350 (illustrated as CCP instance 1376A) is executed (e.g., within the instance 1362A) on the virtualization layer 1354. In embodiments where compute virtualization is not used, the CCP instance 1376A is executed, as a unikernel or on top of a host operating system, on the "bare metal" general purpose control plane device 1304. The instantiation of the CCP instance 1376A, as well as the virtualization layer 1354 and instances 1362A-R if implemented, are collectively referred to as software instance(s) 1352.

In some embodiments, the CCP instance 1376A includes a network controller instance 1378. The network controller instance 1378 includes a centralized reachability and forwarding information module instance 1379 (which is a middleware layer providing the context of the network controller 1278 to the operating system and communicating with the various NEs), and an CCP application layer 1380 (sometimes referred to as an application layer) over the middleware layer (providing the intelligence required for various network operations such as protocols, network situational awareness, and user—interfaces). At a more abstract level, this CCP application layer 1380 within the centralized control plane 1276 works with virtual network view(s) (logical view(s) of the network) and the middleware layer provides the conversion from the virtual networks to the physical view.

The centralized control plane 1276 transmits relevant messages to the data plane 1280 based on CCP application layer 1380 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 1280 may receive different messages, and thus different forwarding information. The data plane 1280 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 1280, the packet (or a subset of the packet header and content) is typically forwarded to the centralized control plane 1276. The centralized control plane 1276 will then program forwarding table entries into the data plane 1280 to accommodate packets belonging to the flow of the unknown packet. Once a specific forwarding table entry has been programmed into the data plane 1280 by the centralized control plane 1276, the next packet with matching credentials will match that forwarding table entry and take the set of actions associated with that matched entry.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method of an electronic device in an edge cloud at an edge of a $3^{rd}$ Generation Partnership Project (3GPP) wireless communication network to support extended reality (XR) overlay placement for an object having a real world location, the method comprising:
   receiving, at the edge cloud, a request from an XR application of a user equipment operating with the object in the 3GPP wireless communication network, the request including a request identifier to identify a location of the user equipment having the XR application and an object identifier to identify the object that is a target of an XR overlay rendered by the XR application;
   obtaining the location of the user equipment based on the request identifier;
   determining, at the edge cloud, a static motion probability field (S-MPF) for the object based on the object identifier corresponding to the location of the user equipment provided by the request identifier;
   retrieving, at the edge cloud, the S-MPF;
   updating, at the edge cloud, the S-MPF based on the location and dynamic data to generate a dynamic motion probability field (D-MPF) for the object;
   receiving, at the edge cloud, additional dynamic data from the XR application and updated location of the user equipment; and
   updating, at the edge cloud, the D-MPF based on the additional dynamic data and updated location to generate an updated D-MPF.

2. The method of claim 1, further comprising:
   returning the D-MPF to the XR application at the user equipment.

3. The method of claim 1, further comprising:
   retrieving the S-MPF from a cache of the edge cloud.

4. The method of claim 1, further comprising:
   updating the S-MPF based on the location or the object to limit the S-MPF.

5. The method of claim 1, wherein the object identifier encodes a manufacturer or owner of the object, a type of the object, and a time limit for retention of the object identifier.

6. The method of claim 1, further comprising:
   returning the updated D-MPF to the XR application.

7. An electronic device in an edge cloud at an edge of a $3^{rd}$ Generation Partnership Project (3GPP) wireless communication network to support extended reality (XR) overlay placement for an object in a real world location, the electronic device comprising:

a machine-readable storage medium having stored therein an XR overlay service; and a processor coupled to the machine-readable storage medium, the processor to execute the XR overlay service, wherein the XR overlay service to:

receive, at the edge cloud, a request from an XR application of a user equipment that operates with the object in the 3GPP wireless communication network, the request including a request identifier to identify a location of the user equipment having the XR application and an object identifier to identify the object that is a target of an XR overlay rendered by the XR application;

obtain the location of the user equipment based on the request identifier;

determine, at the edge cloud, a static motion probability field (S-MPF) for the object based on the object identifier corresponding to the location of the user equipment provided by the request identifier;

retrieve, at the edge cloud, the S-MPF;

update, at the edge cloud, the S-MPF based on the location and dynamic data to generate a dynamic motion probability field (D-MPF) for the object;

receive, at the edge cloud, additional dynamic data from the XR application and updated location of the user equipment; and update, at the edge cloud, the D-MPF based on the additional dynamic data and updated location to generate an updated D-MPF.

8. The electronic device of claim 7, wherein the XR overlay service is further to return the D-MPF to the XR application at the user equipment.

9. The electronic device of claim 7, wherein the XR overlay service is further to retrieve the S-MPF from a cache of the edge cloud.

10. The electronic device of claim 7, wherein the XR overlay service is further to update the S-MPF based on the location or the object to limit the S-MPF.

11. The electronic device of claim 7, wherein the object identifier encodes a manufacturer or owner of the object, a type of the object, and a time limit for retention of the object identifier.

12. The electronic device of claim 7, wherein the XR overlay service is further to return the updated D-MPF to the XR application.

* * * * *